(12) United States Patent
Yokoyama

(10) Patent No.: US 11,396,429 B2
(45) Date of Patent: Jul. 26, 2022

(54) CONVEYANCE DEVICE, DRIVEN UNIT, AUXILIARY UNIT, AND PALLET

(71) Applicant: HIRATA CORPORATION, Kumamoto (JP)

(72) Inventor: Shinji Yokoyama, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 17/136,182

(22) Filed: Dec. 29, 2020

(65) Prior Publication Data

US 2021/0114815 A1  Apr. 22, 2021

Related U.S. Application Data

(63) Continuation of application No. PCT/JP2018/025592, filed on Jul. 5, 2018.

(51) Int. Cl.
*B65G 35/06* (2006.01)
*B23Q 7/14* (2006.01)
(Continued)

(52) U.S. Cl.
CPC ........... *B65G 35/06* (2013.01); *B23Q 7/1452* (2013.01); *B65G 35/08* (2013.01); *B65G 47/88* (2013.01);
(Continued)

(58) Field of Classification Search
CPC .... B23Q 7/1452; B23Q 7/1442; B65G 47/88; B65G 35/06; B65G 35/08; B65G 47/8823; B65G 2203/0283; B65G 2201/0267
(Continued)

(56) References Cited

U.S. PATENT DOCUMENTS 3,818,837 A * 6/1974 Jacoby ................. B65G 35/063
104/166
4,428,300 A * 1/1984 Ziegenfus ............ B65G 35/063
104/166

(Continued)

FOREIGN PATENT DOCUMENTS

CN 103803251 A 5/2014
JP S5934972 A 2/1984
(Continued)

OTHER PUBLICATIONS

International Search Report (PCT/ISA/210) dated Sep. 25, 2018, by the Japan Patent Office as the International Searching Authority for International Application No. PCT/JP2018/025592.
(Continued)

*Primary Examiner* — James R Bidwell
(74) *Attorney, Agent, or Firm* — Buchanan Ingersoll & Rooney PC

(57) ABSTRACT

A conveyance device includes a pair of first and second support frames provided so as to be parallel to each other, and configured to define a conveyance track of a pallet; a driving unit provided on the first support frame and configured to apply a conveyance force to the pallet; a driven unit as a unit forming the pallet, configured to travel along a first guide portion of the first support frame by the driving unit; an auxiliary unit as a unit forming the pallet, connected to the driven unit via a placement member of the pallet and capable of freely traveling along a second guide portion of the second support frame, and a stopping unit including an engaging portion that engages with a portion of the driven unit, and configured to temporarily stop a movement of the pallet.

11 Claims, 18 Drawing Sheets

(51) Int. Cl.
*B65G 47/88* (2006.01)
*B65G 35/08* (2006.01)

(52) U.S. Cl.
CPC .............. *B65G 2201/0267* (2013.01); *B65G 2203/0283* (2013.01)

(58) Field of Classification Search
USPC .......................................... 198/345.1–345.3
See application file for complete search history.

(56) References Cited

U.S. PATENT DOCUMENTS

| | | | |
|---|---|---|---|
| 4,532,869 A | | 8/1985 | Kondo et al. |
| 4,691,641 A | * | 9/1987 | Rohrbach ............. B61B 13/125 |
| | | | 104/165 |
| 4,793,261 A | * | 12/1988 | Schwaemmle ...... B23Q 7/1457 |
| | | | 104/172.3 |
| 4,964,343 A | | 10/1990 | Haruna et al. |
| 5,860,505 A | * | 1/1999 | Metzger ............. B65G 47/8823 |
| | | | 198/463.4 |

FOREIGN PATENT DOCUMENTS

| | | |
|---|---|---|
| JP | S62161114 U | 10/1987 |
| JP | H03205213 A | 9/1991 |
| JP | H0356138 Y2 | 12/1991 |
| JP | 2601873 Y2 | 12/1999 |
| JP | 2005028459 A | 2/2005 |
| JP | 2008133130 A | 6/2008 |
| JP | 2014091613 A | 5/2014 |

OTHER PUBLICATIONS

Japanese Office Action dated Jul. 10, 2020, concerning Japanese Patent Application No. 2019-521491.

Extended European Search Report dated Jun. 8, 2021, issued by the European Patent Office in corresponding European Application No. 18925132.5. (11 pages).

Office Action dated Dec. 10, 2021, in corresponding Chinese Patent Application No. 201880095287.7 and English translation of the Office Action. (13 pages).

* cited by examiner

CONVEYANCE DEVICE, DRIVEN UNIT, AUXILIARY UNIT, AND PALLET

CROSS-REFERENCE TO RELATED APPLICATION

This application is a Continuation of International Patent Application No. PCT/JP2018/025592, filed Jul. 5, 2018, the entire disclosure of which is incorporated herein by reference.

TECHNICAL FIELD

The present invention relates to a workpiece conveyance technique using a pallet.

BACKGROUND ART

A system is known in which, when a workpiece is to be conveyed, the workpiece is placed on a pallet serving as a transfer body and the workpiece is conveyed by moving the pallet (for example, Japanese Patent Laid-Open No. 2005-28459). If some processing is performed on the workpiece during the conveyance, it is necessary to temporarily stop the workpiece. Japanese Utility Model Registration No. 2601873 discloses a system having such a temporary stop function. The pallet is basically a dedicated product for each workpiece. However, manufacturing a pallet from the beginning for each of different workpiece types and for each factory causes a cost increase. Japanese Utility Model Publication No. 3-56138 discloses a technique in which the arrangement of a pallet is unitized to facilitate specification changes of the pallet.

Regarding a conveyance device, it is necessary to arrange a plurality of conveyance devices in series to form a predetermined conveyance layout. Accordingly, when changing specifications of such a conveyance device, it is necessary to consider changes in the specifications (for example, width and length) of not only the pallet but also the conveyance mechanism that conveys the pallet. Japanese Utility Model Publication No. 3-56138 is advantageous in changing specifications of the pallet, but does not consider facilitation of specification changes of the conveyance mechanism. Further, pallets are mass-produced products that are required in large numbers corresponding to the number of conveyed workpieces. Therefore, it is necessary to reduce the cost as much as possible. Mounting a driving source such as a motor on a pallet causes a cost increase.

SUMMARY OF INVENTION

It is an object of the present invention to provide a technique advantageous in changing specifications of a conveyance device and suppressing the manufacturing cost of a pallet.

According to an aspect of the present invention, there is provided a conveyance device comprising a pair of a first support frame and a second support frame provided so as to be parallel to each other, and configured to define a conveyance track of a pallet including a placement member on which a workpiece is placed, a driving unit provided on the first support frame and configured to apply a conveyance force to the pallet, a driven unit as a unit forming the pallet, configured to travel along a first guide portion of the first support frame by receiving the conveyance force from the driving unit, an auxiliary unit as a unit forming the pallet, connected to the driven unit via the placement member and capable of freely traveling along a second guide portion of the second support frame, and a stopping unit provided on the first support frame, including an engaging portion that engages with a portion of the driven unit, and configured to temporarily stop a movement of the pallet at a predetermined stop position along the conveyance track.

Further features of the present invention will become apparent from the following description of exemplary embodiments (with reference to the attached drawings).

DESCRIPTION OF EMBODIMENTS

Embodiments of the present invention will be described with reference to the attached drawings. Throughout the drawings, arrows X and Y indicate directions perpendicular to each other and an arrow Z indicates the vertical direction in each drawing.

First Embodiment

Figure 1:
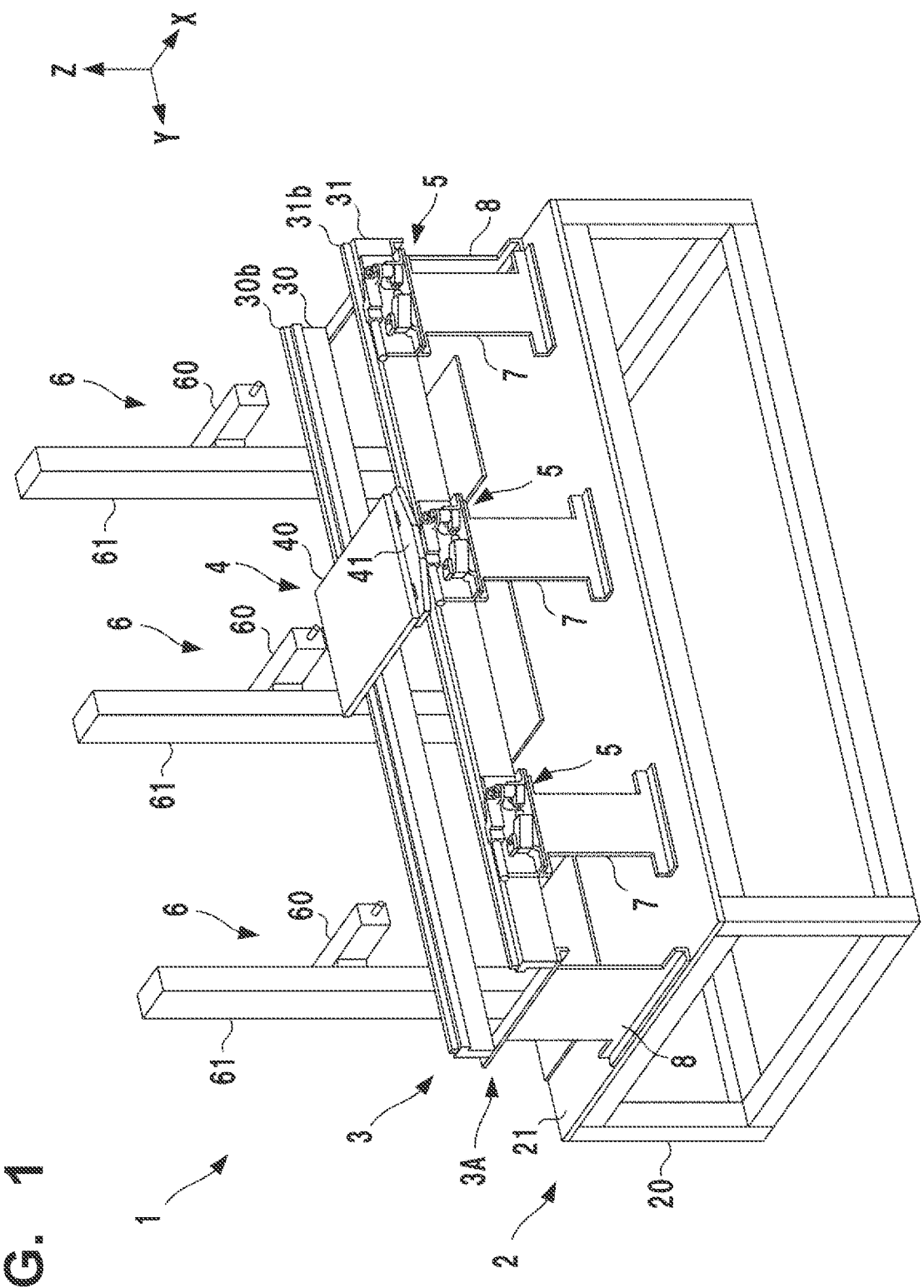
FIG. 1 is a perspective view of a work system to which the present invention is applied.

<Work System>
FIG. 1 is a perspective view of a work system 1 to which the present invention is applied. The work system 1 includes a stand 2, a conveyance device 3 that conveys a workpiece (not shown), and a plurality of work devices 6. The conveyance device 3 includes a plurality of stopping units 5. In an actual factory or the like, the work system is constructed by forming a conveyance layout using a plurality of the conveyance devices 3 based on the workpiece conveyance specifications, and appropriately arranging each work device 6 at a predetermined position in the formed conveyance layout. For example, as in a layout example shown in FIG. 18, a configuration can be constructed in which a plurality of the stands 2 and the conveyance devices 3 shown in FIG.

Figure 18:
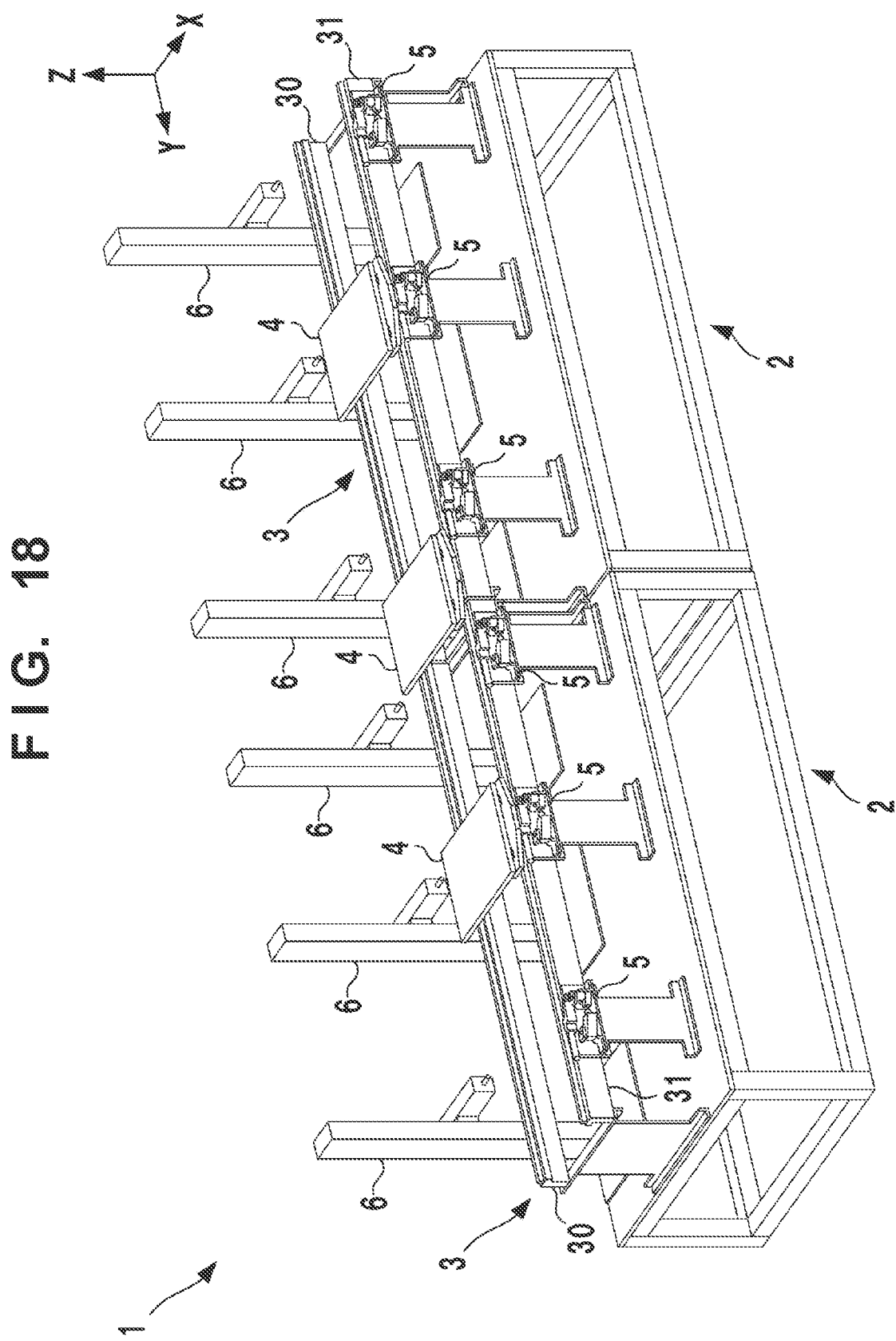
FIG. 18 is a perspective view of the work system of still another example.

1 (two stands and two conveyance devices in the example shown in FIG. 18) are arranged in the Y direction.

The stand 2 is a structure that supports the conveyance device 3 and the plurality of work devices 6. The stand 2 includes a frame 20 having a rectangular parallelepiped shape and a base plate 21 supported on the frame 20. The conveyance device 3, the respective stopping units 5, and the respective work devices 6 are installed on the base plate 21. The conveyance device 3 is fixed to the base plate 21 via two leg members 8. Each stopping unit 5 is fixed via a corresponding positioning unit 7.

<Conveyance Device>

The conveyance device 3 according an embodiment of the present invention includes a conveyance mechanism 3A, a pallet 4, and the plurality of stopping units 5, and the conveyance mechanism 3A moves the pallet 4 in the Y direction serving as the workpiece conveyance direction. The pallet 4 includes a placement member 40 on which a workpiece (not shown) as a work target is placed.

Figure 2:
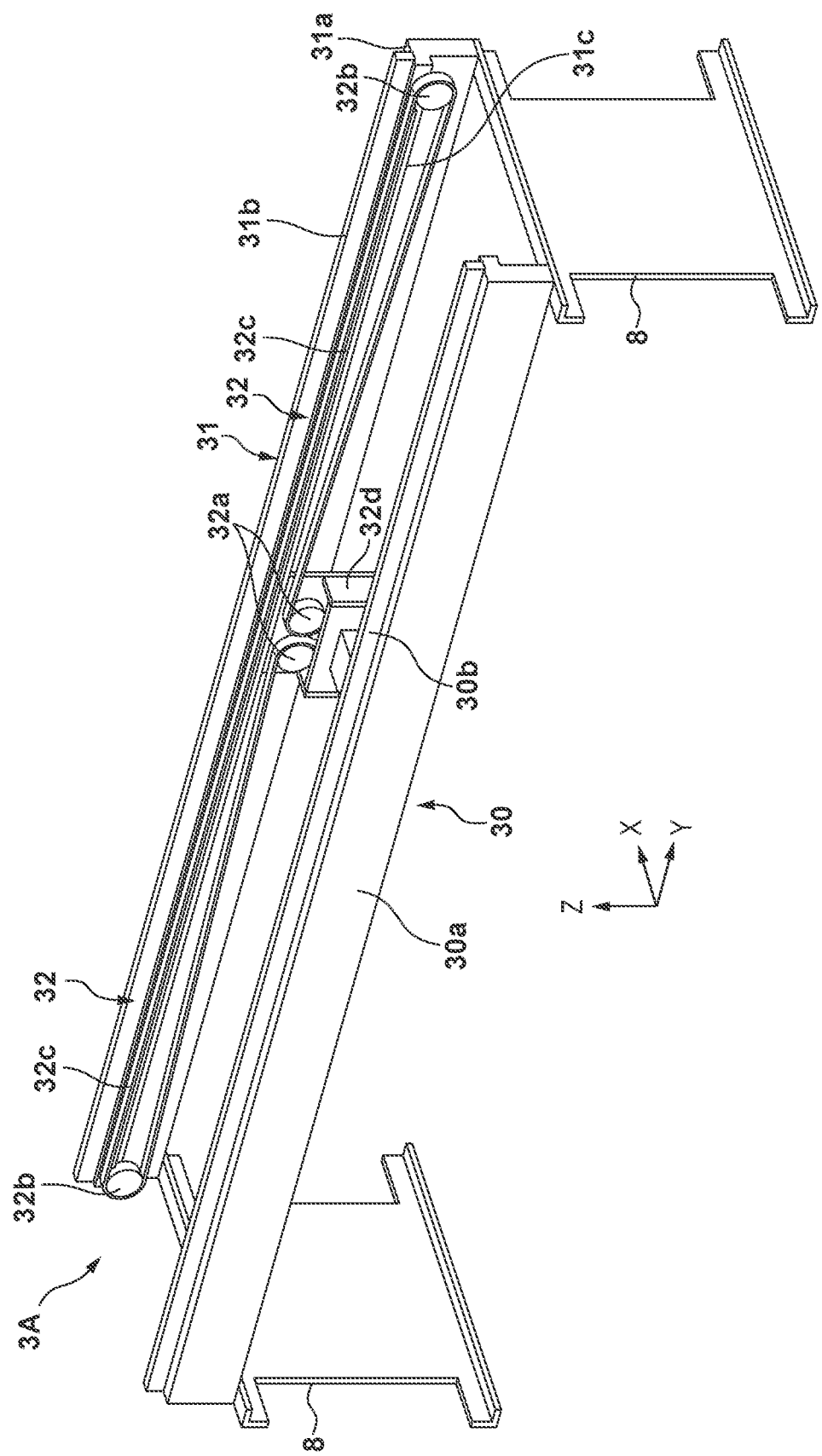
FIG. 2 is a view for explaining a conveyance mechanism.

With reference to FIGS. 1 and 2, the structure of the conveyance mechanism 3A of this embodiment will be described. FIG. 2 is a view for explaining the conveyance mechanism 3A. The conveyance mechanism 3A includes a pair of support frames 30 and 31 that define the conveyance track of the pallet 4. In this embodiment, the conveyance track is a track extending in the Y direction. The pair of support frames 30 and 31 extend in parallel with each other in the Y direction. The support frames 30 and 31 are spaced apart from each other in the X direction, which is the widthwise direction of the conveyance device 3 (the widthwise direction of the conveyance track), and are separably connected by the leg members 8. In this respect, the leg member 8 is a connecting member. The pair of support frames 30 and 31 are separate members. If the width of the conveyance track is to be increased, the separation distance between the support frames 30 and 31 in the X direction is changed and the support frames 30 and 31 may be fixed to the leg members 8 or another connecting members equivalent to the leg members 8.

The support frame 30 includes a frame main body 30a and a guide portion 30b supported on the frame main body 30a. The frame main body 30a and the guide portion 30b extend in the Y direction. The guide portion 30b has a rectangular sectional shape. The support frame 31 includes a frame main body 31a and a guide portion 31b supported on the frame main body 31a. The frame main body 31a and the guide portion 31b extend in the Y direction. The guide portion 31b has a rectangular sectional shape.

The support frame 31 further includes a support portion 31c that supports a drive transmission member 32c to be described later and guides a movement thereof. The support portion 31c also extends in the Y direction. The support portion 31c includes a first guide portion serving as a portion that guides a part of the inner peripheral surface of the drive transmission member 32c over the Y direction, and a second guide portion serving as a portion that guides a part of the side portion of the drive transmission member 32c over the Y direction. The first guide portion guides the transmission member 32c while defining the height thereof over the Y direction, and the second guide portion guides the transmission member 32c over the Y direction while defining the movement thereof in the widthwise direction. The support portion 31c may be provided integrally with the frame main body 31a, or may be provided separately from the frame main body 31a.

Both of the guide portions 30b and 31b guide the pallet 4 at a constant conveyance height. The guide portion 30b defines the conveyance height in the height direction (Z direction) on one side of the pallet 4 in the widthwise direction, and the guide portion 31b defines the conveyance height in the height direction (Z direction) on the other side of the pallet 4 in the widthwise direction. In this embodiment, the guide portion 31b alone functions as the conveyance guide portion in the widthwise direction (X direction).

A driving unit 32 is supported on the inner side surface of the frame main body 31a of the support frame 31 facing the frame main body 30a. The driving unit 32 applies a conveyance force to the pallet 4. That is, the pallet 4 is a driven body that is driven by the driving unit 32. Thus, the pallet 4 itself needs no driving source such as a motor for movement. With this arrangement, the manufacturing cost of the pallet 4 can be reduced.

In this embodiment, the driving unit 32 is a belt transfer mechanism. More specifically, the driving unit 32 includes the drive transmission member 32c, which is an endless belt, a plurality of driven pulleys 32a and 32b, and a driving portion 32d. The driving portion 32d incorporates a motor as a driving source and a driving pulley (neither is shown). The drive transmission member 32c is wounded around the driving pulley in the driving portion 32d and the plurality of driven pulleys 32a and 32b, and cyclically travels. The pallet 4 moves following the travel of the drive transmission member 32c.

The driven pulleys 32b are rotatably supported at respective end portions of the frame main body 31a in the Y direction, and the driven pulleys 32a are rotatably and axially supported in the central portion of the frame main body 31a in the Y direction while being adjacent to each other. In addition, the above-described driving pulley (not shown) is rotatably supported at a position below the both driven pulleys 32a in the frame main body 31a. The upper traveling portion of the drive transmission member 32c extends from one driven pulley 32b to the other driven pulley 32b, and is guided while being defined in the height direction by the support portion 31c.

<Pallet>

Figure 3:
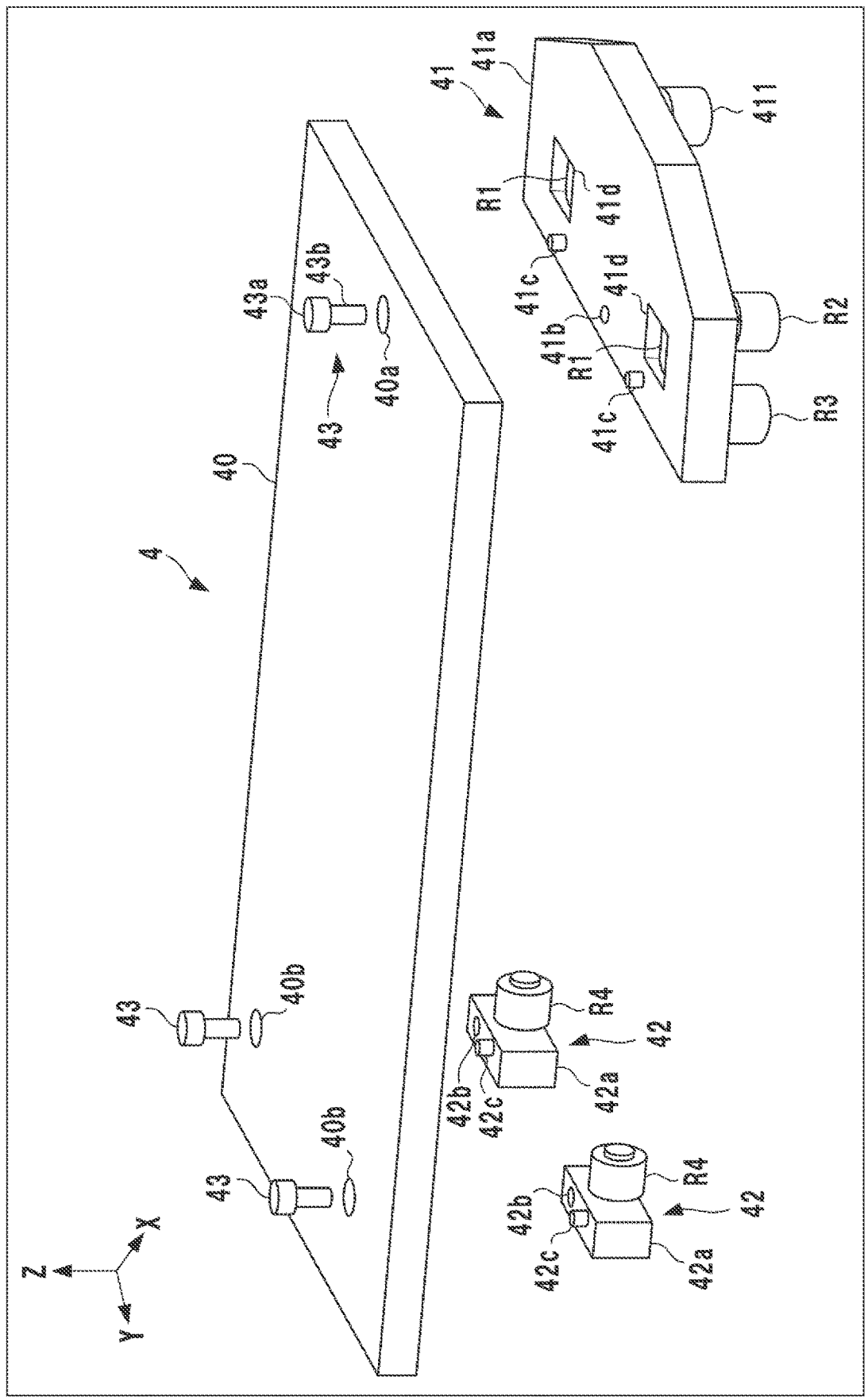
FIG. 3 is an exploded perspective view of a pallet.
Figure 4:
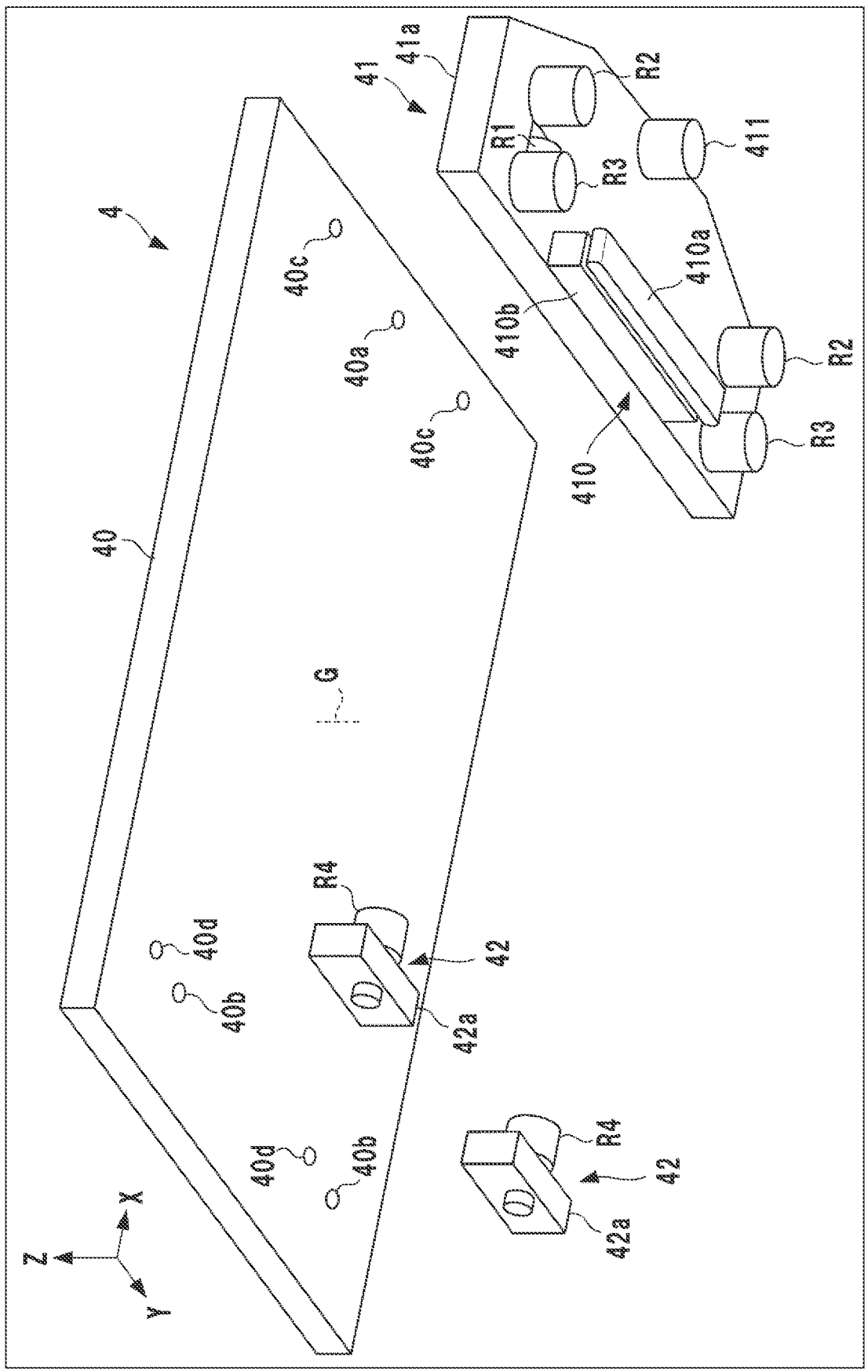
FIG. 4 is another exploded perspective view of the pallet.

With reference to FIGS. 3 and 4, the structure of the pallet 4 of this embodiment will be described. FIGS. 3 and 4 are exploded perspective views of the pallet 4 from different viewpoints. In this embodiment, the pallet 4 is roughly divided into three units that can be disassembled and assembled. One of the three units is the placement member 40, another one is a driven unit 41, and the remaining one is an auxiliary unit 42. In the example shown in FIGS. 3 and 4, two auxiliary units 42 are provided. The driven unit 41 supports a wheel group (rollers R1 to be described later) on one side of the pallet 4 in the widthwise direction (the X direction in FIG. 1), and the auxiliary units 42 support a wheel group (rollers R4 to be described later) on the other side of the pallet 4 in the widthwise direction, thereby improving the traveling stability of the pallet 4.

The placement member 40 is a member on which a workpiece is to be placed. The driven unit 41 is a travel unit that travels along the guide portion 31b of the support frame 31 by receiving a conveyance force from the driving unit 32. The auxiliary unit 42 is a travel unit that is connected to the driven unit 41 via the placement member 40 and capable of traveling along the guide portion 30b of the support frame 30.

The placement member 40 can be manufactured by dedicated design corresponding to the type of workpiece. For example, the X- and Y-direction lengths of the placement member 40 are designed in accordance with the size of workpiece. It is also possible to design the thickness (Z-direction length) of the placement member 40 in accordance with the weight of workpiece. Further, a protrusion, a depression, an opening (hole or the like), or the like is provided in the placement member 40 in accordance with the shape of workpiece. On the other hand, each of the driven unit 41 and the auxiliary unit 42 is a common part that need not be designed in accordance with the type of workpiece, that is, an unchanged part whose design is not changed. Therefore, it is not required to redesign the entire pallet 4 each time the type of workpiece changes, so that regarding the pallet 4, it is only required to change the placement member 40 prepared in advance in accordance with the workpiece to be conveyed.

Due to such a property, the driven unit 41 and the auxiliary unit 42 can be regarded as the building components of the pallet 4 and also as the building components of the conveyance mechanism 3A. That is, it can be said that the conveyance device 3 in this embodiment is formed by the conveyance mechanism 3A and the pallet 4, and it can also be said that the conveyance device 3 is formed by the conveyance mechanism 3A including the driven unit 41 and the auxiliary unit 42, and the placement member 40. Note that in a system including a plurality of the conveyance devices 3 arranged in series as illustrated in FIG. 18, the pallet 4 including the driven unit 41 and the auxiliary unit 42 moves in a conveyance path formed by different conveyance mechanisms 3A.

The placement member 40 is a plate-shaped rectangular member as a whole having a barycentric position G, and a workpiece is to be placed on the upper surface thereof. The placement member 40 includes mounting holes 40a and 40b penetrating in the thickness direction.

The mounting hole 40a is a fixing hole for the placement member 40 and the driven unit 41, and a fixing member 43 is inserted into the mounting hole 40a. Although other fixing methods can also be adopted, the fixing method is bolt fastening and the fixing member 43 is a bolt in this embodiment. The fixing member 43 includes a head portion 43a and a screw shaft 43b, and the mounting hole 40a is a stepped hole including a large-diameter portion in which the head portion 43a is accommodated and a small-diameter portion into which the screw shaft 43b is inserted and screwed.

The mounting hole 40b is a fixing hole for the placement member 40 and the auxiliary unit 42. In this embodiment, two auxiliary units 42 are provided so as to be spaced apart from each other in the Y direction. Accordingly, two mounting holes 40b are also provided so as to be spaced apart from each other in the Y direction. Although other fixing methods can also be adopted, the fixing method is bold fastening as in the driven unit 41 in this embodiment, and the fixing member 43 is inserted into the mounting hole 40b. Similar to the mounting hole 40a, the mounting hole 40b is a stepped hole including a large-diameter portion in which the head portion 43a of the fixing member 43 is accommodated and a small-diameter portion into which the screw shaft 43b is screwed.

In the lower surface of the placement member 40, engaging portions 40c for positioning the driven unit 41 and engaging portions 40d for positioning the auxiliary units 42 are formed. Although other positioning structures can also be adopted, the positioning structure is a fitting structure of a hole and a shaft, and the engaging portions 40c and 40d are both covered fitting holes in this embodiment.

An engaging portion 41c corresponding to the engaging portion 40c is provided on the driven unit 41, and the engaging portion 41c is a fitting shaft (fitting pin) that fits into the engaging portion 40c. In this embodiment, two sets of the engaging portion 40c and the engaging portion 41c are provided so as to be spaced apart from each other in the Y direction. That is, the driven unit 41 and the placement member 40 are positioned at two positions, so that they can be positioned more accurately in both the X and Y directions. An engaging portion 42c corresponding to the engaging portion 40d is provided on the auxiliary unit 42, and the engaging portion 42c is a fitting body (fitting pin) that fits into the engaging portion 40d.

Figure 5:
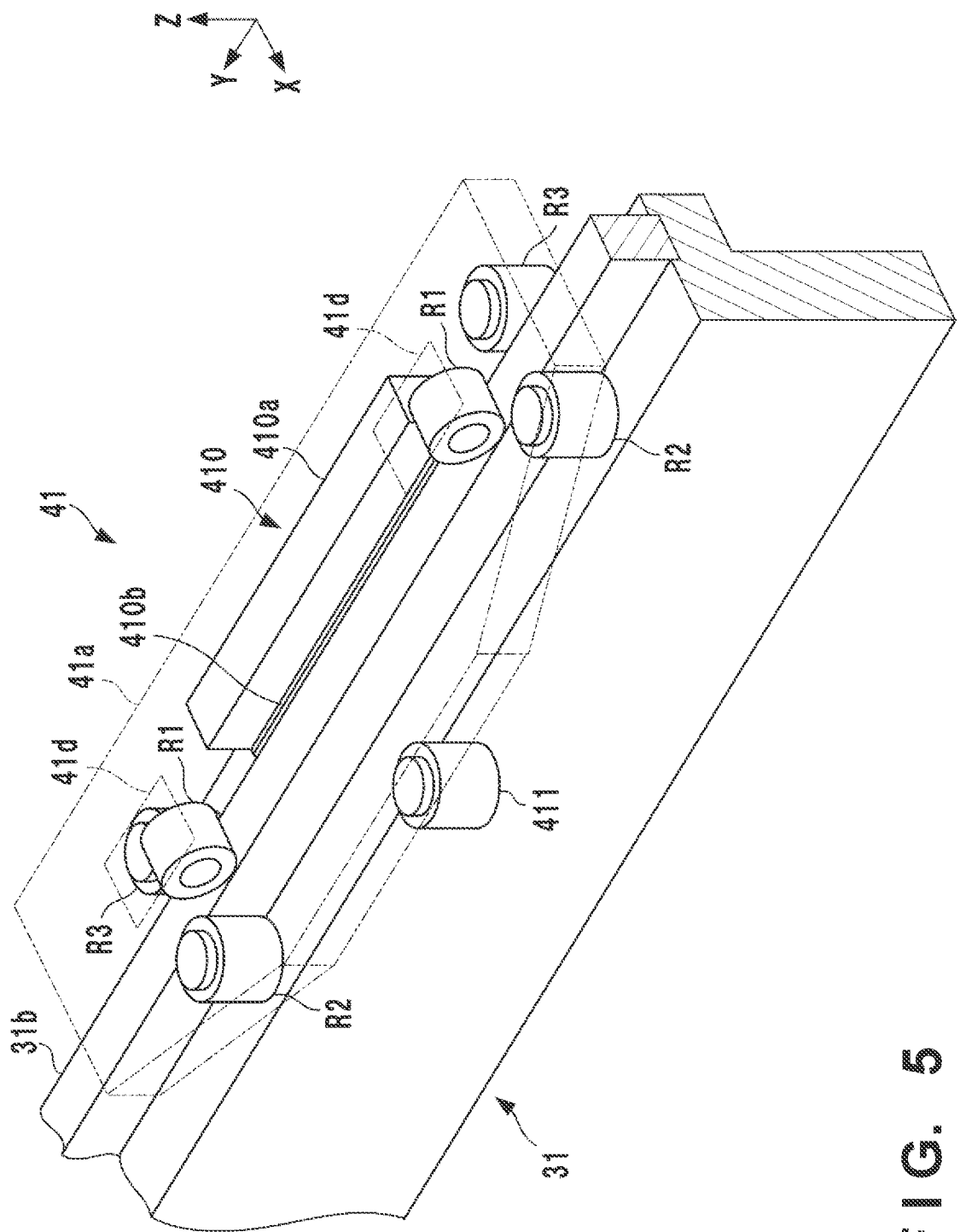
FIG. 5 is a view for explaining the arrangement of components of a driven unit.

Next, the arrangement of the driven unit 41 will be described with reference to FIGS. 3 to 5. FIG. 5 is a view for explaining the arrangement of the components of the driven unit 41 (a main body member 41a is shown by virtual lines).

The driven unit 41 includes the plate-like main body member 41a. A mounting hole 41b and the two engaging portions 41c are formed on the upper surface of the main body member 41a. As has been described above, the two engaging portions 41c are fitting shafts for positioning the placement member 40 and the driven unit 41 by fitting into the engaging portions 40c. The mounting hole 41b is a fixing hole for the placement member 40 and the driven unit 41. In this embodiment, the mounting hole 41b is a screw hole, and the screw shaft 43b of the fixing member 43 passing through the mounting hole 40a (small-diameter portion) of the placement member 40 is screwed into the mounting hole 41b. Thus, the placement member 40 is fixed to the main body member 41a so as to be stacked on the upper surface of the main body member 41a.

The main body member 41a includes a plurality of opening portions 41d penetrating in the thickness direction, and the roller R1 is arranged in each opening portion 41d. The roller R1 is supported by a shaft body fixed in the opening portion 41d and extending in the X direction. The roller R1 is rotatable around the shaft body. In this embodiment, two sets of the roller R1 and the opening portion 41d are provided so as to be spaced apart from each other in the conveyance direction (the Y direction in FIG. 5). The two rollers R1 are support rollers that abut against the upper surface of the guide portion 31b and roll on the guide portion 31b while being supported from below by the upper surface of the guide portion 31b.

A set of rollers R2 and R3 is provided on the lower portion (bottom surface) of the main body member 41a so as to sandwich each opening portion 41d. The roller R2 abuts against one side surface (outer guide surface) of the guide portion 31b, and the roller R3 abuts against the other side surface (inner guide surface) of the guide portion 31b, thereby regulating the position of the pallet 4 on the horizontal plane in a direction orthogonal to the conveyance direction (the X direction in FIG. 5). In this embodiment, each of the rollers R2 and R3 is a guide roller rotatably supported by a shaft body extending in the Z direction. Two sets of the rollers R2 and R3 are provided so as to be spaced apart from each other in the Y direction. The rollers R2 and R3 are arranged so as to be spaced apart from each other in the X direction and face each other, and the gap between the rollers R2 and R3 is approximately equal to the width of the guide portion 31b. In other words, the rollers R2 and R3 are arranged so as to sandwich the guide portion 31b.

A frictional engagement unit 410 is provided on the bottom surface of the main body member 41a. The frictional engagement unit 410 is a unit that receives a conveyance force from the driving unit 32. The frictional engagement unit 410 includes a frictional engagement member 410a that abuts against the drive transmission member 32c, and a pressing unit 410b that presses the frictional engagement member 410a downward (downward in the Z direction in FIG. 5), that is, toward the drive transmission member 32c. The pressing unit 410b incorporates a spring, and an elastic force (biasing force) of the spring presses the frictional engagement member 410a against the drive transmission member 32c. A pressing force of the frictional engagement unit 410 that presses the frictional engagement member 410a against the outer peripheral surface of the drive transmission member 32c is received by the support portion 31c. Consequently, the drive transmission member 32c is sandwiched between the frictional engagement member 410a and the support portion 31c. Accordingly, when the drive transmission member 32c travels, a friction force caused by frictional engagement is generated between the frictional engagement member 410a and the drive transmission member 32c. The friction force is transmitted to the pallet 4 as a traveling force, and the pallet 4 is conveyed in the Y direction. Note that the elastic force of the spring of the pressing unit 410b is set so as to be smaller than the weight of the pallet 4 but fall within a range in which a friction force to move the pallet 4 can be obtained even when a workpiece is placed on the pallet 4.

An engaging portion 411 is further provided on the bottom surface of the main body member 41a. The engaging portion 411 is provided in one end portion of the main body member 41a in the X direction, and in this embodiment, it is a cylindrical body with a circular cross section. When the engaging portion 411 engages with the stopping unit 5 during conveyance of the pallet 4, the conveyance of the pallet 4 is temporarily stopped. The engaging portion 411 may be a rolling member that is rotatable around the Z-axis. By using the engaging portion 411 as the rolling member, friction at the time of engagement between the engaging portion 411 and the stopping unit 5 is reduced, so that the pallet 4 can be temporarily stopped and released in a smooth manner.

The frictional engagement unit 410 and the engaging portion 411 are provided between the two sets of the rollers R2 and R3 when viewed in the Y direction. Since the two sets of the rollers R2 and R3 abut against the guide portion 31b to regulate displacement of the driven unit 41 in the X direction, when a conveyance force is transmitted or when a temporary stop force is applied, the tilt (pitching) around the X-axis, the tilt (rolling) around the Y-axis, or the tilt (yawing) around the Z-axis of the driven unit 41 can be prevented, so that it is possible to more stably move or stop the driven unit 41.

Figure 6:
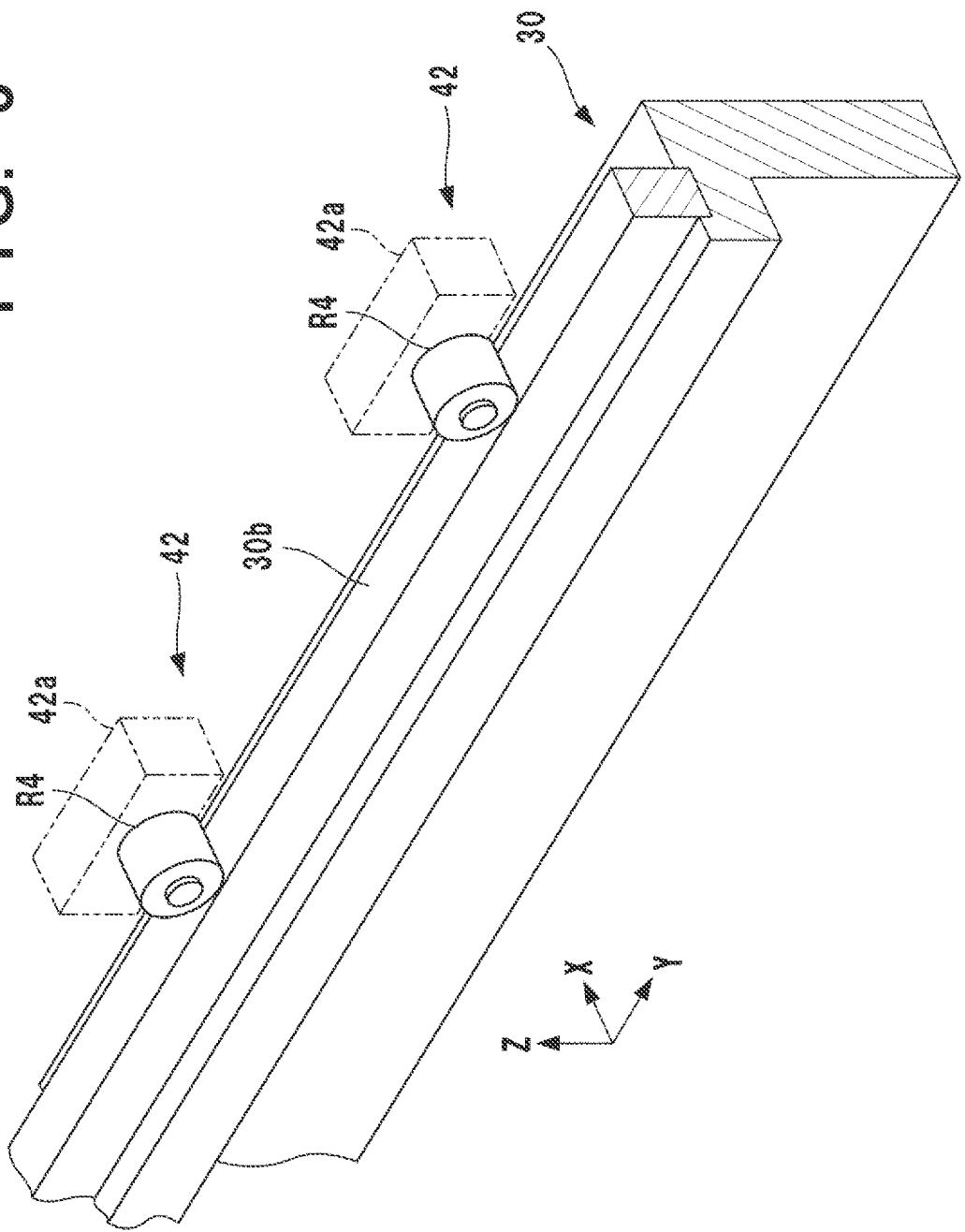
FIG. 6 is a view for explaining the arrangement of components of an auxiliary unit.

Next, the arrangement of the auxiliary unit 42 will be described with reference to FIGS. 3, 4, and 6. FIG. 6 is a view for explaining the arrangement of the components of the auxiliary unit 42 (a main body member 42a is shown by virtual lines).

The auxiliary unit 42 includes the block-shaped main body member 42a. A mounting hole 42b and the engaging portion 42c are formed on the upper surface of the main body member 42a. As has been described above, the engaging portion 42c is a fitting pin that fits into the engaging portion 40d to position the placement member 40 and the auxiliary unit 42. The mounting hole 42b is a mounting hole for fixing the placement member 40 and the auxiliary unit 42. In this embodiment, the mounting hole 42b is a screw hole, and the screw shaft 43b of the fixing member 43 passing through the mounting hole 40b of the placement member 40 is screwed into the mounting hole 42b. Thus, the placement member 40 is fixed to the main body member 42a so as to be stacked on the upper surface of the main body member 42a. Accordingly, the auxiliary unit 42 and the driven unit 41 are separably connected via the placement member 40, and the pallet 4 is integrated as a whole.

Note that in this embodiment, a case in which the pallet 4 includes the two auxiliary units 42 has been described as an example, but the number of the auxiliary units 42 is not particularly limited. For example, in the pallet 4 shown in FIG. 3, the number of the auxiliary units 42 may be changed to one without changing the driven unit 41. At this time, the auxiliary unit 42 is preferably provided on the frame main body 30a side of the placement member 40 and in its intermediate portion in the conveyance direction (the Y direction in FIG. 3). By using the pallet 4 including only one auxiliary unit 42, it is possible to further suppress rattling in the horizontal direction and further reduce the manufacturing cost, as compared with the pallet 4 including the two auxiliary units 42.

The roller R4 is provided on the side surface of the main body member 42a. The roller R4 is rotatably supported by a shaft body extending in the direction perpendicular to the conveyance direction on a surface (a right side surface in FIG. 3) of the main body member 42a facing the driven unit 41. The roller R4 abuts against the upper surface of the guide portion 30b, and rolls on the guide portion 30b.

As has been described above, in the conveyance device 3 of this embodiment, the driven unit 41 receives a conveyance force from the drive transmission member 32c and receives a temporary stop force from the stopping unit 5. Further, the driven unit 41 regulates displacement in the X direction (rollers R2 and R3), while the auxiliary unit 42 only rolls on the guide portion 30b. That is, the driven unit 41 is configured to have multi-functionality, while the auxiliary unit 42 has a simple arrangement. This makes it possible to concentratedly arrange the driving unit 32 and the stopping unit 5 on the support frame 31 side where the driven unit 41 is located. This can facilitate a consideration of the layout of the conveyance track when a plurality of the conveyance devices 3 are arranged in series as shown in FIG. 18, and the alignment between the units can be performed in the support frame 31 and the driven unit 41. Further, it becomes easy to secure a space for arranging the work device 6 on the side of the auxiliary unit 42 and the support frame 30.

<Work Device>

The work device 6 will be described with reference to FIG. 1. The work device 6 is a device for performing work such as processing, assembling, or inspection on a workpiece on the pallet 4. In this embodiment, three work devices 6 are arranged along the conveyance direction (Y direction) of the conveyance device 3. Each work device 6 includes a working head 60 and a moving unit 61 that moves the working head 60. The moving unit 61 has a pillar shape extending in the Z direction, and is arranged in a standing condition on an installation portion. The moving unit 61 can move the working head 60 in the Z direction and the X direction. The working head 60 is a mechanism for performing work on a workpiece.

<Stopping Unit and Positioning Unit>

Figure 7:
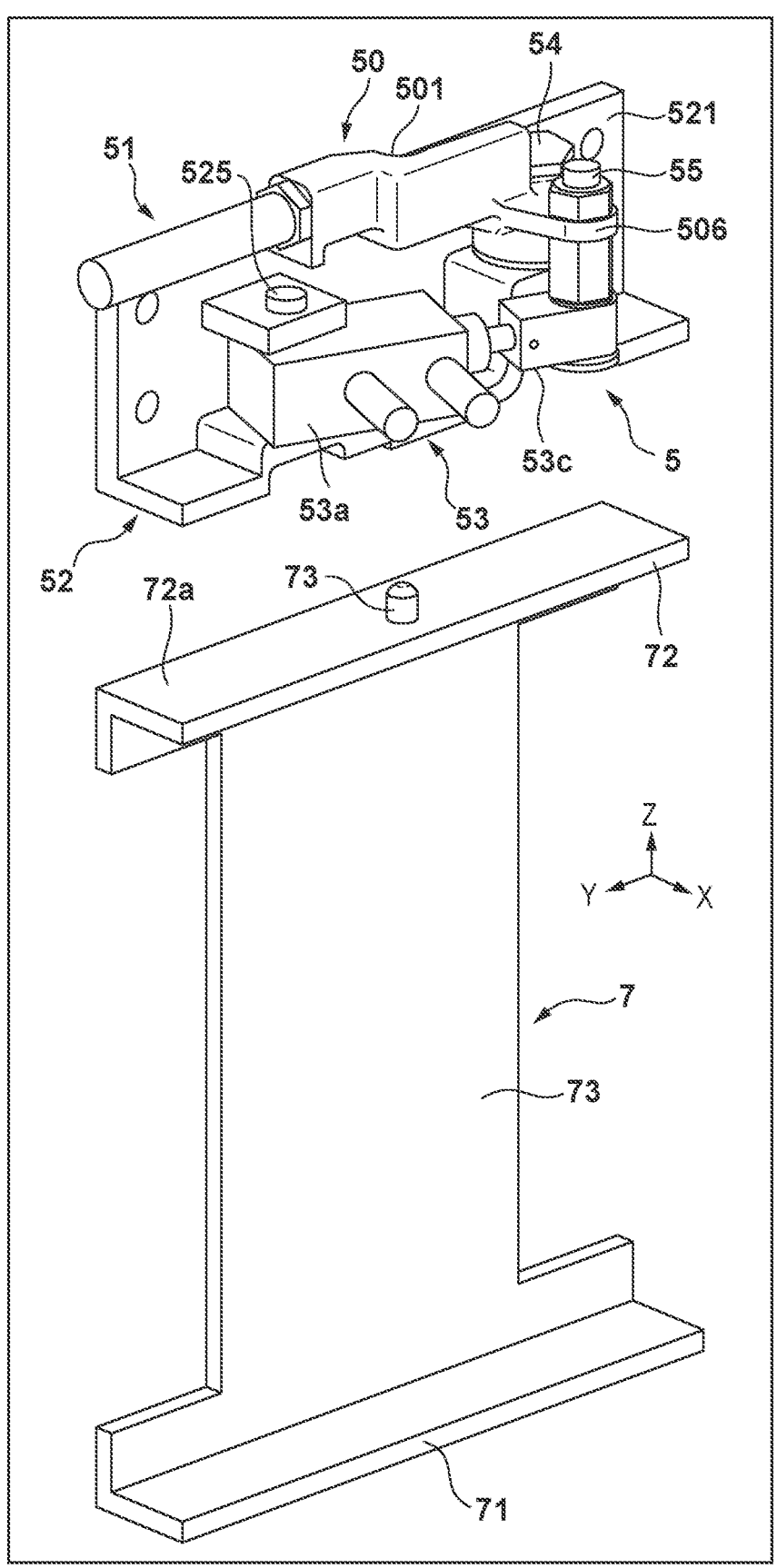
FIG. 7 is a perspective view showing a stopping unit and an alignment unit.
Figure 8:
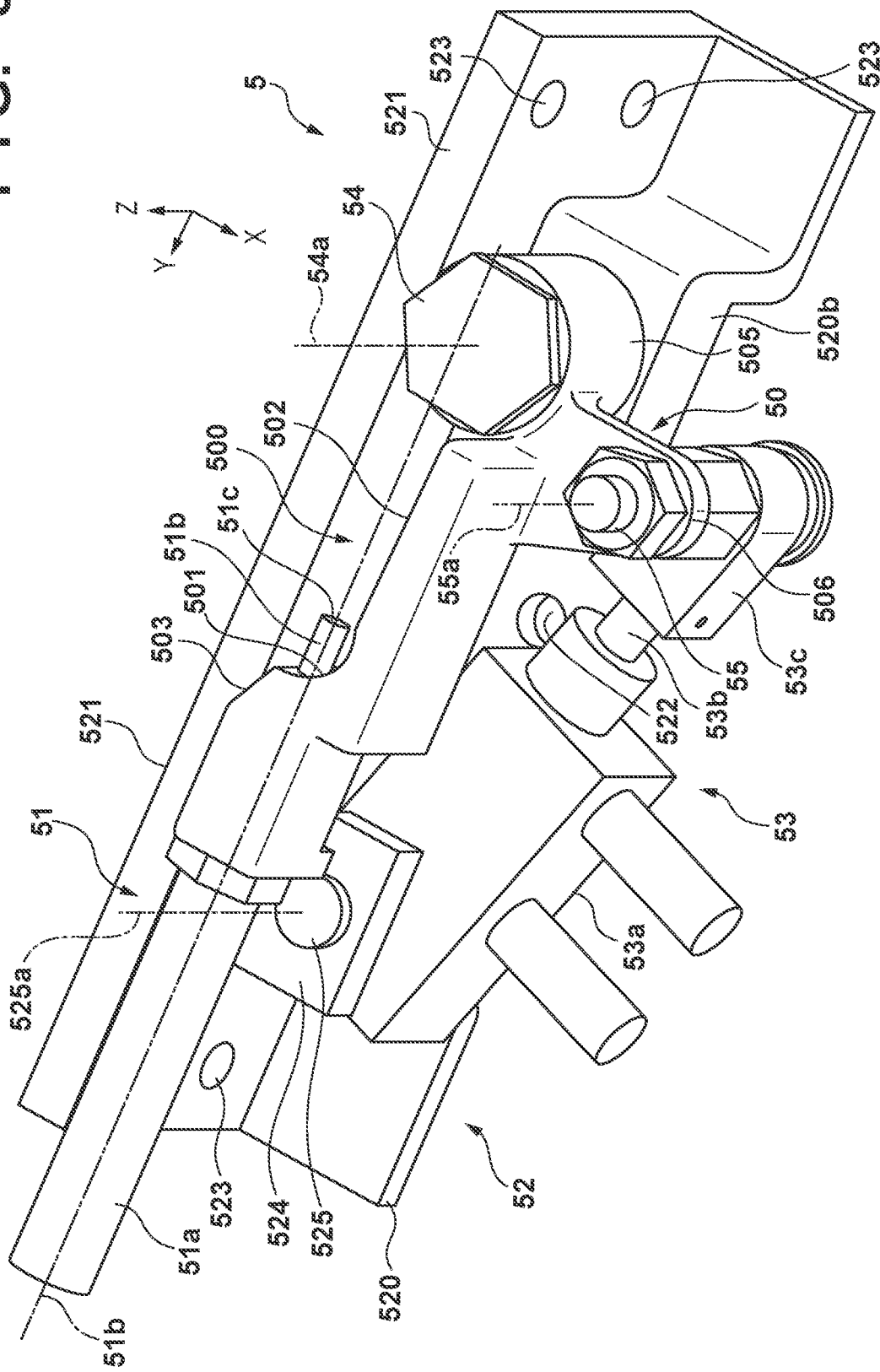
FIG. 8 is a perspective view of the stopping unit.
Figure 9:
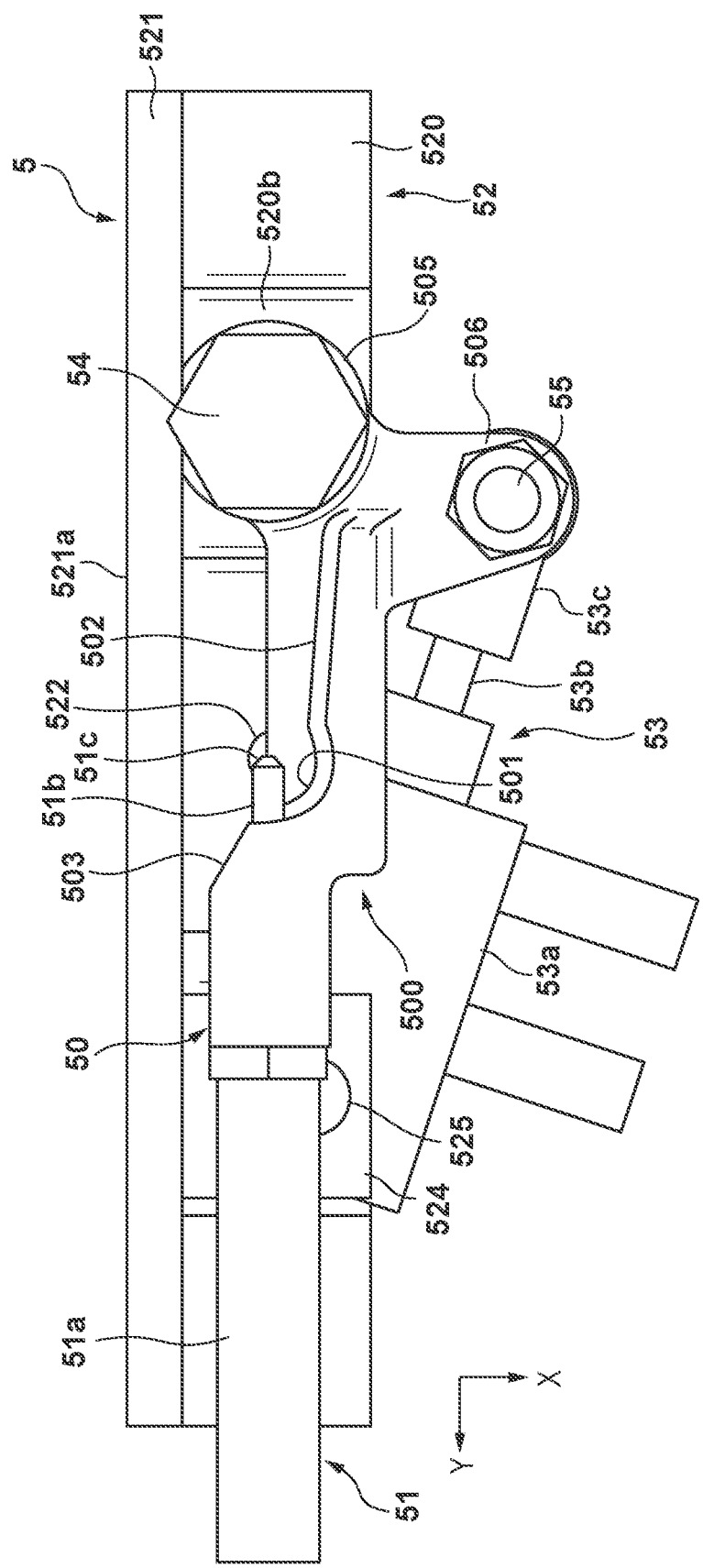
FIG. 9 is a plan view of the stopping unit.
Figure 10:
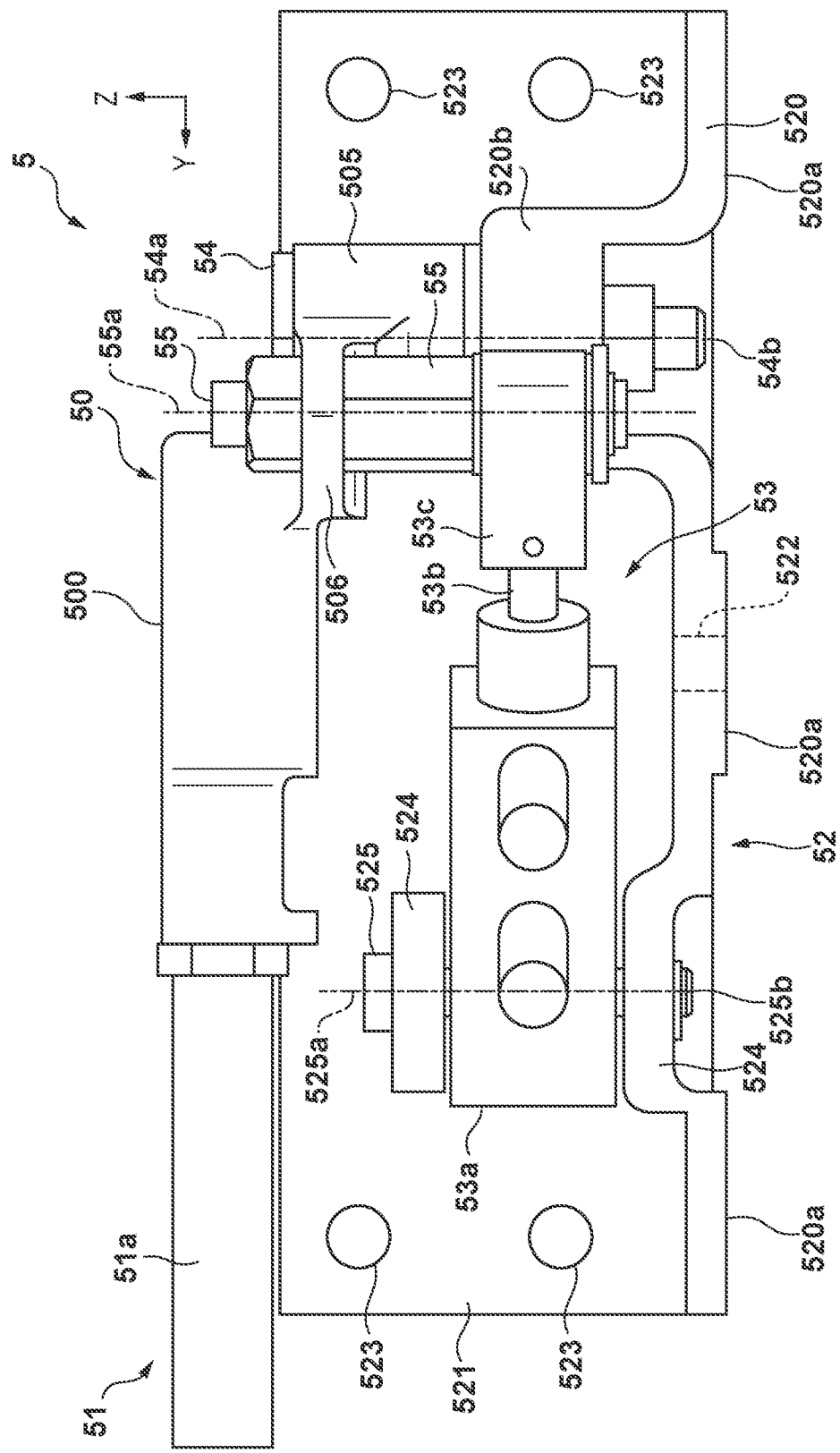
FIG. 10 is a front view of the stopping unit.
Figure 11:
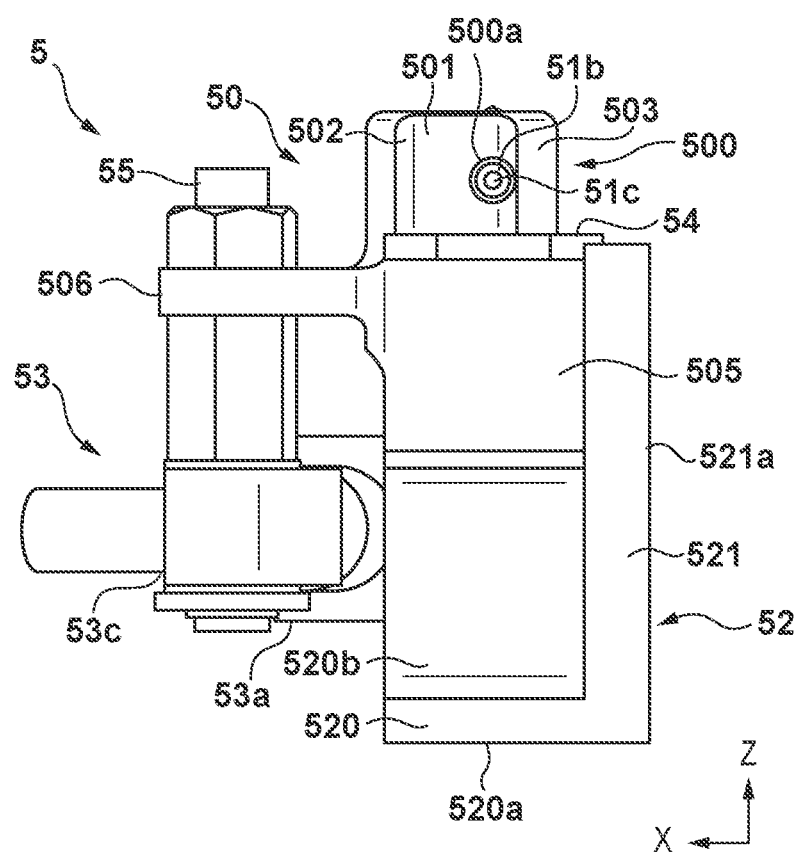
FIG. 11 is a right side view of the stopping unit.
Figure 12:
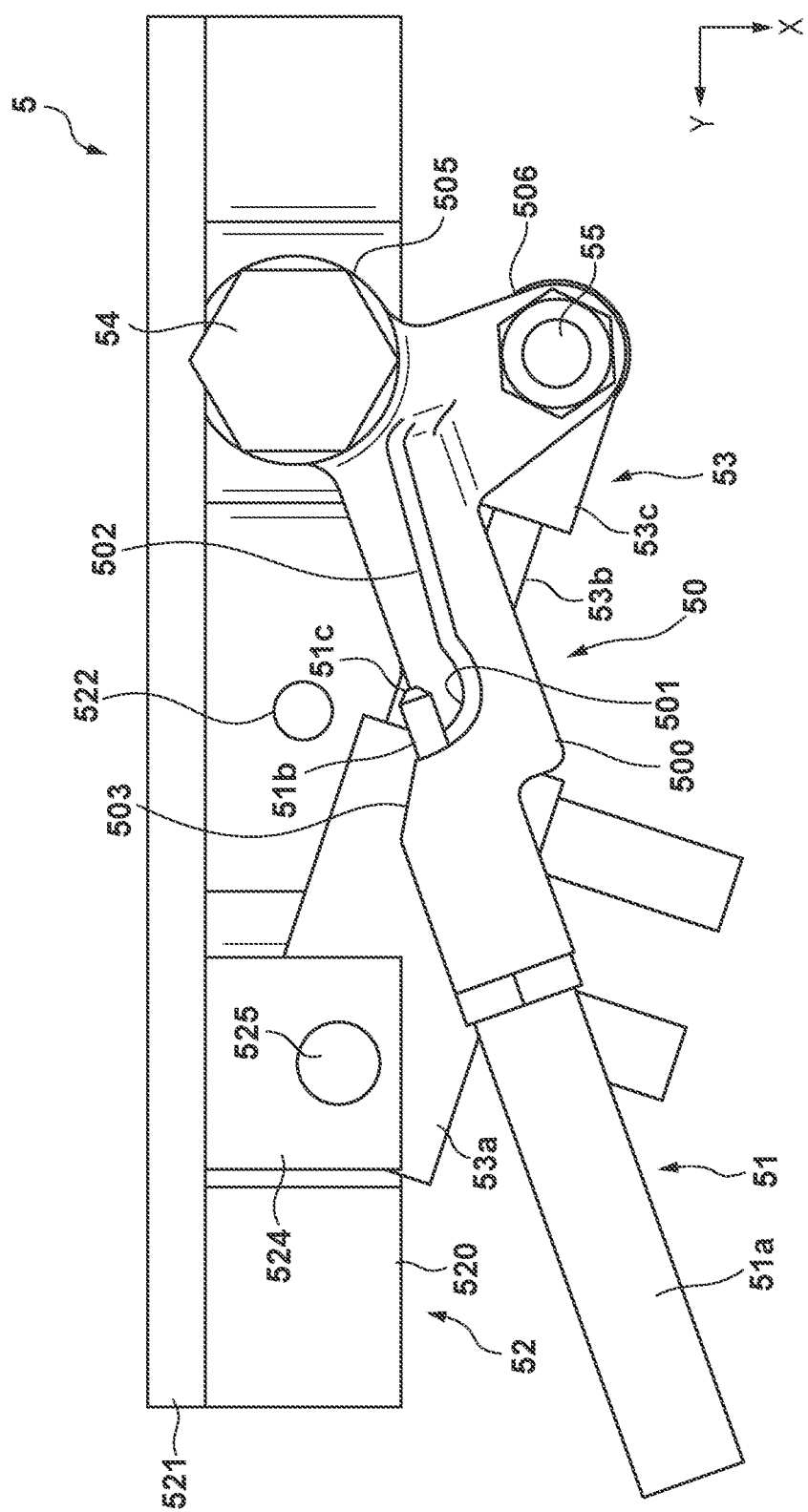
FIG. 12 is a view for explaining an operation of the stopping unit.
Figure 13:
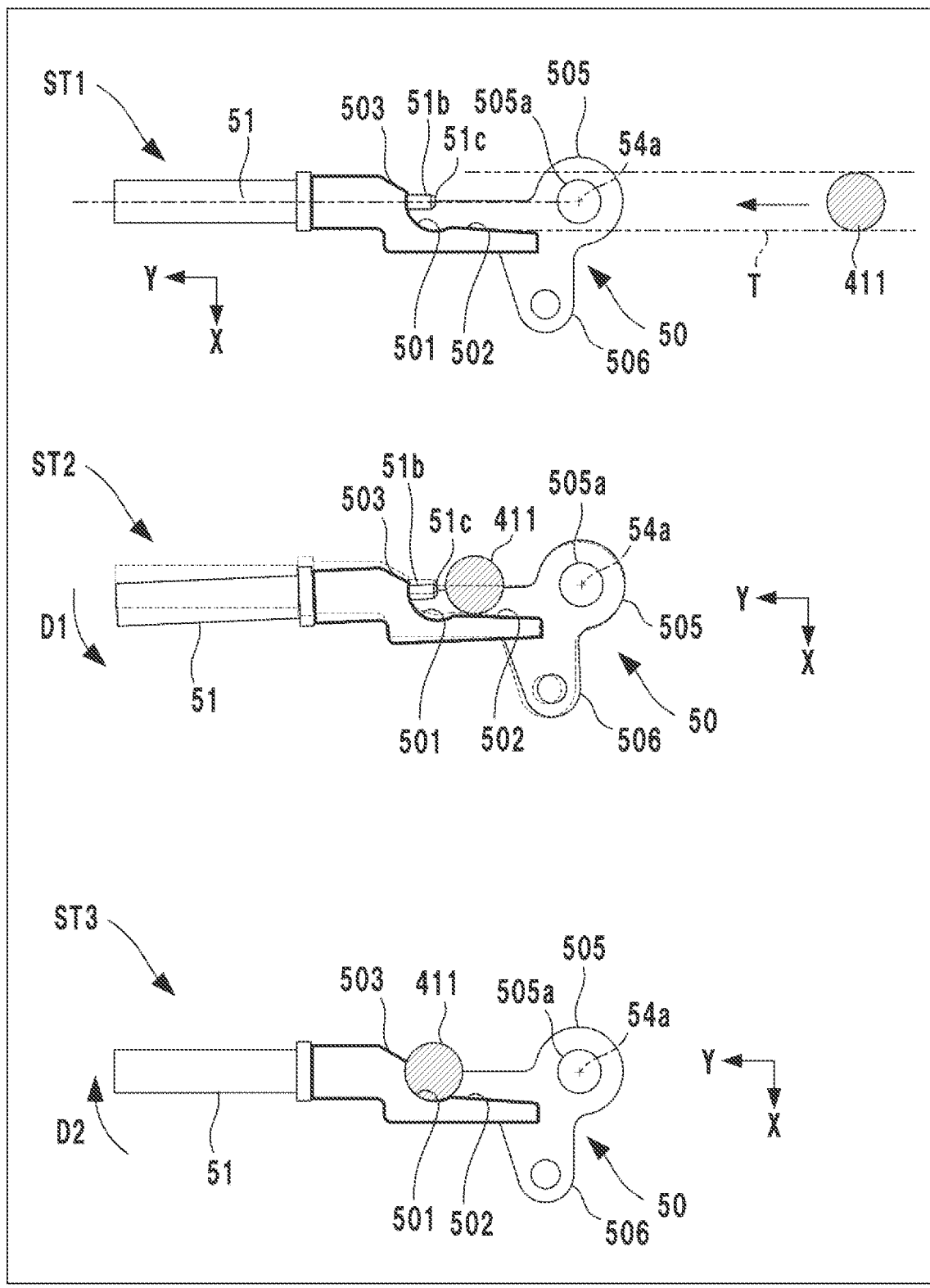
FIG. 13 is a view for explaining an engagement operation of a movable member.

The arrangement of the stopping unit 5 provided in the conveyance device 3 will be described with reference to FIG. 1 and FIGS. 7 to 13. FIG. 7 is a perspective view (exploded perspective view) showing the stopping unit 5 and the positioning unit 7, FIG. 8 is a perspective view of the stopping unit 5, FIG. 9 is a plan view of the stopping unit 5, FIG. 10 is a front view of the stopping unit 5, FIG. 11 is a right side view of the stopping unit 5, FIG. 12 is a view for explaining an operation of the stopping unit 5, and FIG. 13 is a view for explaining an engagement operation of a movable member 50. Note that the stopping unit 5 described below is an example, and a stopping unit having another arrangement can also be adopted.

The positioning unit 7 is a member on which the stopping unit 5 is installed and which aligns the stopping unit 5 with the conveyance device 3. In this embodiment, the positioning unit 7 is a member including lower and upper mounting portions 71 and 72, and a vertical plate portion 73 connecting the mounting portions 71 and 72.

The mounting portion 71 is a portion that fixes the positioning unit 7 to the base plate 21 of the stand 2. The fixing structure is bolt fastening, for example. The mounting portion 72 is a portion to which the stopping unit 5 is fixed, and its upper surface forms a horizontal reference surface 72a. The reference surface 72a defines the Z-direction position of the stopping unit 5.

A reference engaging portion 73 is formed on the reference surface 72a. In this embodiment, the reference engaging portion 73 is a pin-shaped shaft member that protrudes upward from the reference surface 72a. The Y-direction position of the stopping unit 5 is defined by the reference engaging portion 73.

Note that in this embodiment, a structure is adopted in which the positioning unit 7 is fixed to the stand 2 to align the stopping unit 5 with the conveyance device 3, but the present invention is not limited to this. A structure may be adopted in which the positioning unit 7 is fixed to the conveyance device 3 to align the stopping unit 5 with the conveyance device 3.

The stopping unit 5 is a device that temporarily stops the pallet 4 by engaging with the engaging portion 411 of the pallet 4, and the engaging portion 411 of the pallet 4 engages with a recess portion 501 to be described later. The stop position of the pallet 4 is a position corresponding to the working position of each work device 6, and three stop positions are provided in the example shown in FIG. 1. Accordingly, three stopping units 5 in total are provided corresponding to the respective stop positions. In this embodiment, since the pallet 4 is stopped at each stop position, the working position of each work device 6 and the worked position of a workpiece face each other. This makes it possible to perform work on the workpiece more accurately.

The stopping unit 5 includes the movable member 50, a support member 52, and an actuator 53. The movable member 50 is a member that temporarily stops movement of the pallet 4 in the conveyance direction by engaging with the engaging portion 411 of the pallet 4, and integrally includes a main body portion 500, a cylindrical portion 505, and a connecting portion 506. The cylindrical portion 505 and the connection portion 506 are located on the upstream side (one side) of the main body portion 500 in the conveyance direction (Y direction) of the pallet 4. The cylindrical portion 505 is formed with a Z-direction shaft hole 505a (FIG. 13) into which a pivot shaft portion 54b (FIG. 10) of a shaft member 54 is inserted. The pivot shaft portion 54b is a shaft portion extending in the Z direction, and the shaft member 54 is supported by a support portion 520b provided on one side of the support member 52.

The cylindrical portion 505 provided on the one side is supported by the support member 52 via the shaft member 54 so as to be pivotable around an axis 54a thereof, so that the movable member 50 is displaceable between an engagement position shown in FIG. 9 and an engagement release position shown in FIG. 12. The engagement position is a position at which the other side of the movable member 50 apart from the cylindrical portion 505 engages with the engaging portion 411 of the pallet 4 so that the pallet 4 is temporarily stopped. The engagement release position is a position at which the engagement between the other side of the movable member 50 apart from the cylindrical portion 505 and the engaging portion 411 of the pallet 4 is released so that the pallet 4 is set in a movable state. Note that the displacement mode of the movable member 50 is a pivot movement around the axis 54a in this embodiment, but it may be a translational movement.

The stopping unit 5 further includes a shock absorber 51. The shock absorber 51 is fixed to an end portion of the main body portion 500 of the movable member 50 on the downstream side (the other side). In this embodiment, the shock absorber 51 is a cylinder damper, and includes a cylinder portion 51a and a rod portion 51b. When the movable member 50 is at the engagement position, a shock absorbing direction is the Y direction (the conveyance direction of the pallet 4). A fluid that resists the backward movement of the rod portion 51b is sealed inside the cylinder portion 51a. The rod portion 51b includes an abutment portion 51c at its distal end, the abutment portion 51c protrudes into an inner space surrounded by the recess portion 501 to be described later in the main body portion 500. That is, the abutment portion 51c is provided so as to protrude into a region of the abutting portion of the recess portion 501 against which the engaging portion 411 of the pallet 4 abuts. The abutment portion 51c is constantly biased so as to protrude into the region of the abutting portion of the recess portion 501, but when the pallet 4 abuts against the abutment portion 51c, the abutment portion 51c retreats and retracted into the main body portion 500.

The support member 52 is an L-shaped member that integrally includes a bottom wall portion 520 and a side wall portion 521. The bottom surface of the bottom wall portion 520 forms a defining portion 520a serving as a surface that abuts against the reference surface 72a of the positioning unit 7. When the defining portion 520a abuts against the reference surface 72a, the Z-direction position (height position) of the support member 52, that is, the Z-direction (height-direction) position of the stopping unit 5 is defined. Further, a defining portion 522 that engages with the reference engaging portion 73 is formed in the bottom wall portion 520. In this embodiment, the defining portion 522 is an engaging hole penetrating the bottom wall portion 520 in the thickness direction. When the reference engaging portion 73 is fitted into the defining portion 522, the Y-direction position (widthwise-direction position) of the support member 52, that is, the Y-direction (widthwise-direction) position of the stopping unit 5 is defined. Note that in this embodiment, the positioning unit 7 and the support member 52 are defined by the relationship between the reference surface 71a and the defining portion 520a and the relationship between the reference engaging portion 73 and the defining portion 522, but the positioning unit 7 and the support member 52 may be fastened by fasteners (for example, bolts and nuts).

The outer side surface of the side wall portion 521 that abuts against the frame main body 31a forms a defining portion 521a serving as a surface that abuts against the outer side surface of the frame main body 31a. When the outer side surface of the frame main body 31a abuts against the defining portion 521a, the X-direction position (widthwise-direction position) of the support member 52, that is, the X-direction (widthwise-direction) position of the stopping unit 5 is defined. A plurality of mounting holes 523 each penetrating in the thickness direction are provided in the side wall portion 521. By inserting a bolt (not shown) into the mounting hole 523 and fastening it to a fastened portion (a tap hole or nut) prepared in the frame main body 31a, the stopping unit 5 is fixed to the frame main body 31a of the conveyance device 3.

As has been described above, the X-, Y-, and Z-direction positions of the stopping unit 5 with respect to the conveyance track of the pallet 4 are defined by the defining portions 521a, 522, and 520a, respectively. Even when it is necessary to replace the stopping unit 5 due to wear or failure, the defining portions 521a, 522, and 520a enable the replacement while substantially eliminating the need for adjustment work to realign the stopping unit 5. When a new stopping unit 5 is to be mounted, by inserting bolts into the mounting holes 523 and fastening the stopping unit 5 to the conveyance device 3 while the reference engaging portion 73 and the defining portion 522 are engaged, the position of the stopping unit 5 after the replacement can be aligned with the same position as the position of the stopping unit 5 before the replacement. Since the position of the stopping unit 5 before the replacement and the position thereof after the replacement can be realigned to the same position, it is unnecessary to reset the working position of the work device 6 with respect to a workpiece on the pallet 4.

In addition to the above-described support portion 520b, support portions 524 for supporting the driving unit (actuator 53) to be described later, that operates the movable member 50, are integrally formed with the bottom wall portion 520. Since the support portions 520b and 524 are integrally formed with the support member 52 together with the defining portions 521a, 522, and 520a, mutual positional accuracy among them can be improved.

A pair of the support portions 524 are formed so as to be perpendicular to the side wall portion 521 and spaced apart from each other in the Z direction, and a shaft member 525 extending in the Z direction between the support portions 524 is fixed to the support portions 524. The shaft member 525 includes a pivot shaft portion 525b that extends in the Z direction and serves as a pivot center when swinging one end of the actuator 53 as a driving unit. The pivot shaft portion 525b is provided on the downstream side of the pivot shaft portion 54b of the shaft member 54 and the recess portion 501 to be described later in the conveyance direction (Y direction) of the pallet 4, that is, on the other side of the support member 52 so as to be spaced apart from the support portion 520b, and the actuator 53 is supported by the support member 52 so as to be pivotable around an axis 525a of the pivot shaft portion 525b.

In this embodiment, the actuator 53 as a driving unit is a fluid cylinder such as an air cylinder. The actuator 53 includes a driving portion 53a, a rod portion 53b, and an operation portion 53c. The driving portion 53a moves the rod portion 53b forward and backward in the axial direction by taking in and out a fluid. The driving portion 53a includes an insertion portion formed with a shaft hole through which the pivot shaft portion 525b is inserted. The operation portion 53c is provided at the distal end of the rod portion 53b, and connected to the connecting portion 506 of the movable member 50 via a shaft member 55 so as to be pivotable around an axis 55a.

The operation portion 53c is moved by the forward/backward movement of the rod portion 53b with respect to the driving portion 53a, and this movement causes the movable member 50 to pivot around the axis 54a. At this time, the connected portion of the operation portion 53c connected to the connecting portion 506 pivots around the axis 54a (pivots counterclockwise in FIG. 8) as the rod portion 53b is moved forward (extended). With these forward movement and pivot movement, the operation portion 53c, that is, the axis 55a is moved counterclockwise on the circumferential orbit of the axis 55a while maintaining a constant distance from the axis 54a. Along with this, the driving portion 53a is caused to pivot around the axis 525a. When the actuator 53 is moved backward (contracted), the movement opposite to the above-described movement is performed. The contraction of the actuator 53 biases the movable member 50 to the engagement position shown in FIG. 9, and the extension of the actuator 53 displaces the movable member 50 to the engagement release position shown in FIG. 12. When the actuator 53 is contracted, the movable member 50 is biased to the engagement position shown in FIG. 9 but it is not locked at the position, so that the movable member 50 can pivot counterclockwise in FIG. 9 against the biasing force of the actuator 53 by the action of the external force. Although a fluid cylinder exemplifies the actuator 53 in this embodiment, other actuators such as such as an electric cylinder and an electromagnetic solenoid can also be adopted.

Next, the arrangement of the main body portion 500 of the movable member 50 will be described. The recess portion 501 that is recessed in the X direction is formed in a side portion of the main body portion 500 on the conveyance device 3 side so as to face the conveying track of the pallet 4. The recess portion 501 is a portion that engages with the engaging portion 411, and has a shape that matches the engaging portion 411. In this embodiment, since the sectional shape of the engaging portion 411 is circular, the inner surface of the recess portion 501 to abut against the engaging portion 411 forms a C-shape in plan view.

A guide portion 502 is also formed in the side portion of the main body portion 500 on the conveyance device 3 side. The guide portion 502 of this embodiment is an inclined surface extending from the recess portion 501 to the upstream side in the conveyance direction (Y direction). Based on a case in which the movable member 50 is at the engagement position, the guide portion 502 is a continuous surface that is connected to the recess portion 501 while being inclined in the X direction so as to be relatively far from the conveyance device 3 on the upstream side in the conveyance direction and relatively close to the conveyance device 3 on the downstream side. That is, the guide portion 502 is a continuous inclined surface that gradually separates from the moving track of the engaging portion 411 of the pallet 4 that moves on the conveyance device 3 in the conveyance direction (Y direction). The deepest part (the outer end in the X direction) of the recess portion 501 is formed to be deeper than (is located outside in the X direction) the downstream end of the guide portion 502.

An avoidance portion 503 is also formed in the side portion of the main body portion 500 on the conveyance device 3 side. The avoidance portion 503 of this embodiment is an inclined surface extending from the recess portion 501 to the downstream side in the conveyance direction (Y direction). Based on the case in which the movable member 50 is at the engagement position, the avoidance portion 503 is a continuous surface extending from the downstream end of the recess portion 501 while being inclined in the X direction so as to be relatively far from the conveyance device 3 on the upstream side in the conveyance direction and relatively close to the conveyance device 3 on the downstream side. The deepest part (the outer end in the X direction) of the recess portion 501 is deeper than (is located outside in the X direction) the upstream end of the avoidance portion 503.

With reference to FIG. 13, an engagement operation between the recess portion 501, the guide portion 502, and the movable member 50 and the engaging portion 411 will be described. State ST1 shows a state immediately before the pallet 4 is conveyed by the conveyance device 3 so that the engaging portion 411 reaches the movable member 50 while the movable member 50 is at the engagement position. Chain double-dashed lines indicate a moving track T of the engaging portion 411 generated by the conveyance of the pallet 4. Due to the above-described inclination, the guide portion 502 is located at a position away from the moving track T on the upstream side, at a position approaching the moving track T on the downstream side, and at a position on the moving track T at an intermediate part thereof.

Figure 14:
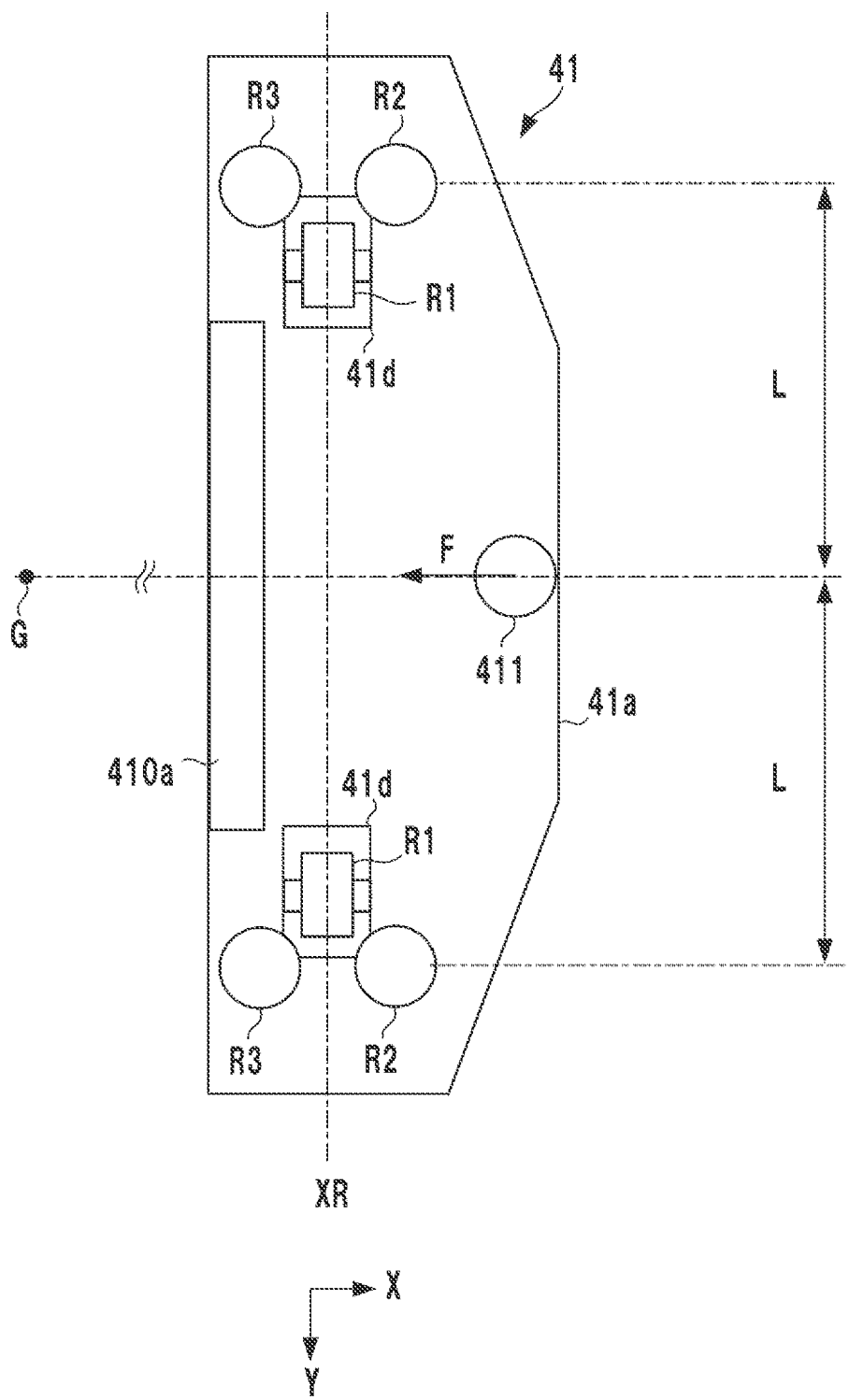
FIG. 14 is a view for explaining the arrangement of the components of the driven unit.

State ST2 shows a state in which the conveyance of the pallet 4 has progressed. The pallet 4 is conveyed by the surface engagement (friction force) between the frictional engagement member 410a and the outer peripheral surface of the drive transmission member 32c. In this embodiment, the pallet 4 is conveyed from the upstream side (the right side in FIG. 13) to the downstream side (the left side in FIG. 13) as the drive transmission member 32c moves. The conveyance of the pallet 4 causes the engaging portion 411 to interfere with the guide portion 502. At this time, as shown in the bottom view in FIG. 14, the pallet 4 receives a force F inward (toward the support frame 30) in the X direction. However, since the displacement of the pallet 4 in the X direction is restricted by the two rollers R2 and the guide portion 31b, the engaging portion 411 presses the movable member 50 outward. At this time, since the engaging portion 411 is located at an equal distance L from each of the roller R2 on the downstream side in the conveyance direction and the roller R2 on the upstream side when viewed in the Y direction, a triangle (in this embodiment, an isosceles triangle) is formed by the engaging portion 411 and the two rollers R2, so that a stable state is achieved. Thus, it is possible to more reliably suppress tilting and meandering of the pallet 4 when receiving the force F. Further, the barycentric position G of the placement member 40 is at the same position as the position of the engaging portion 411 in the Y direction, and the line of action of the force F passes through the barycentric position G or in the vicinity thereof. This further enhances the effect of suppressing tilting and meandering of the pallet 4.

In the pallet 4 conveyed from the upstream side to the downstream side, the engaging portion 411 abuts against the guide portion 502, and the inclined surface of the guide portion 502 gradually moves the engaging portion 411 to the center side of the conveyance device 3. Regarding the movement of the engaging portion 411 toward the center side, since each of the rollers R2 and R2 of the pallet 4 abuts against the side surface of the guide portion 31b and restricts the movement toward the center side, the position in the widthwise direction of the pallet 4 is defined (the movement in the widthwise direction is restricted). As the engaging portion 411 further moves together with the pallet 4, the contact force between the inclined surface of the guide portion 502 and the engaging portion 411 becomes larger than the biasing force of the actuator 53, so that the movable member 50 pivots counterclockwise from the engagement position shown by dotted lines to the position shown by solid lines against biasing of the actuator 53. The conveyance force of the pallet 4 generated by the friction force between the frictional engagement member 410a and the drive transmission member 32c is larger than the biasing force of the actuator 53.

Consequently, the engaging portion 411 rides across the guide portion 502 and enters the recess portion 501. When the engaging portion 411 enters the recess portion 501, the movable member 50 returns to the engagement position by being biased by the actuator 53. Accordingly, the recess portion 501 and the engaging portion 411 engage with each other, and the pallet 4 is held by the guide portion 31b via the driven portion 41. Therefore, the pallet 4 is stopped at the stop position and is positioned and held. When the engaging portion 411 enters the recess portion 501, the engaging portion 411 abuts against the abutment portion 51c of the shock absorber 51, and pushes the rod portion 51b toward the cylinder portion 51a side. At this time, due to the shock absorbing action of the shock absorber 51, the impact at the time of engagement between the recess portion 501 and the engaging portion 411 is alleviated. The recess portion 501 has the C-shape that matches the shape of the engaging portion 411, and the deepest part thereof is located outside the upstream end as described above. Therefore, not only the movement of the engaging portion 411 to the downstream side but also the movement to the upstream side is restricted, and the pallet 4 is also restricted from moving backward to the upstream side due to a reaction at the time of engagement.

Due to the engagement between the engaging portion 411 and the recess portion 501, the pallet 4 is temporarily stopped and the holding of the pallet 4 is completed. At this time, the drive transmission member 32c slides on the frictional engagement member 410a.

When the pallet 4 is temporarily stopped and held, the work device 6 corresponding to the stop position performs work on a workpiece on the pallet 4. When the work is completed, the actuator 53 is driven to cause the movable member 50 to pivot to the engagement release position shown in FIG. 12. This releases the engagement between the engaging portion 411 and the recess portion 501, and the pallet 4 is conveyed. When the engagement is released, since the avoidance portion 503 is formed on the downstream side of the recess portion 501, the engaging portion 411 is gently ejected from the recess portion 501, and the pallet 4 can be conveyed so as to move smoothly from the stop position. Further, since the engagement between the engaging portion 411 and the recess portion 501 is smoothly released, the movable member 50 can smoothly pivot to the engagement release position.

As has been described above, according to this embodiment, it is possible to temporarily stop and hold the pallet 4 using the one movable member 50, and restrict the backward movement of the pallet 4 due to a reaction when it is stopped. Therefore, as compared with a mechanism that implements these effects using a plurality of members, it is possible to implement the temporary stop and holding of the pallet 4 using the smaller number of members.

<Specification Change of Conveyance Device>

The conveyance device 3 configured as described above can easily cope with specification changes when applied to different workpieces. That is, in the pallet 4, it is only required to newly design the placement member 40 in accordance with the workpiece, and the driven unit 41 and the auxiliary unit 42 need not be redesigned. It is also possible to use the existing driven unit 41 and auxiliary unit 42.

When it is necessary to change the width of the placement member 40 in the X direction, it may be required to change the distance between the support frames 30 and 31 in the X direction. In this case, it is only required to change the distance between the support frames 30 and 31 in the X direction and install them on the stand 2, which is easy.

At that time, the driving unit 32 and the stopping unit 5 are intensively provided on the side of the support frame 31, and the driven unit 41 is equipped with the components corresponding to them. Moreover, the driven unit 41 also includes the rollers R2 and R3 for restricting the displacement of the pallet 4 in the X direction, and the components necessary for positioning each portion in the conveyance device 3 are provided in the support frame 31 and the driven unit 41. Therefore, it is almost unnecessary to perform position adjustment or the like of the devices after changing the specifications.

Further, since the driving unit 32 is arranged on the inner side (support frame 30 side) of the support frame 31 and the stopping unit 5 is arranged on the outer side (opposite side) thereof, sufficient spaces for arranging them can be secured. In accordance with this layout, in the driven unit 41, as shown in the bottom view of FIG. 14, the frictional engagement member 410a (frictional engagement unit 410) is arranged inside with respect to a rolling center line XR of the two rollers R1, and the engaging portion 411 is arranged outside with respect to it. Therefore, in the driven unit 41 as well, sufficient spaces for arranging them can be secured.

Second Embodiment

Detecting that the pallet 4 has reached the stop position can provide a guide for a timing of starting work on a workpiece by the work device 6. Therefore, a sensor for detecting that the pallet 4 has reached the stop position may be provided. In this case as well, by arranging a sensor on the support frame 31 and providing the driven unit 41 with a detection target portion to be detected by the sensor, alignment and the like upon changing specifications become easy.

Figure 15:
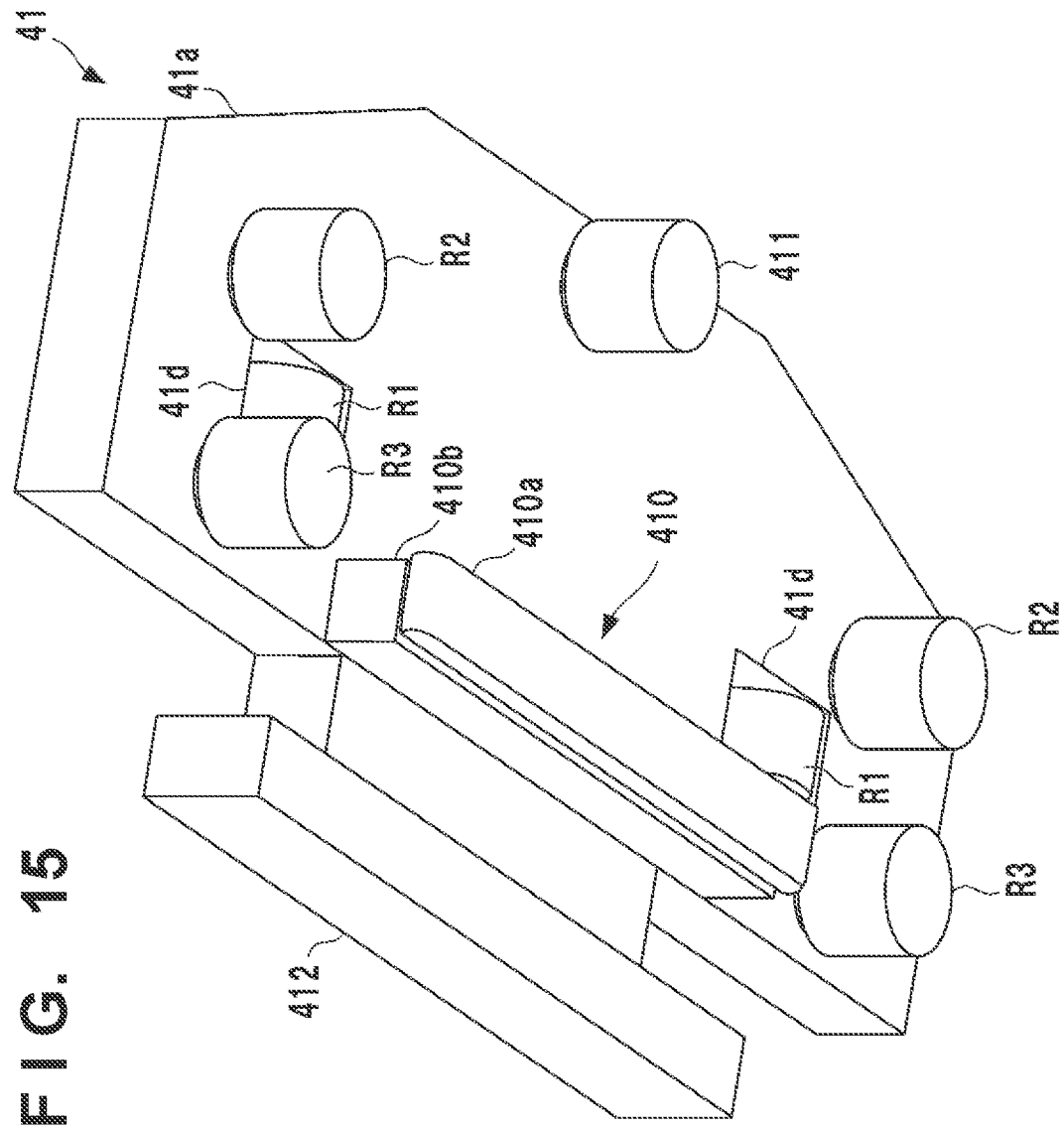
FIG. 15 is a perspective view of a driven unit according to another example.
Figure 16:
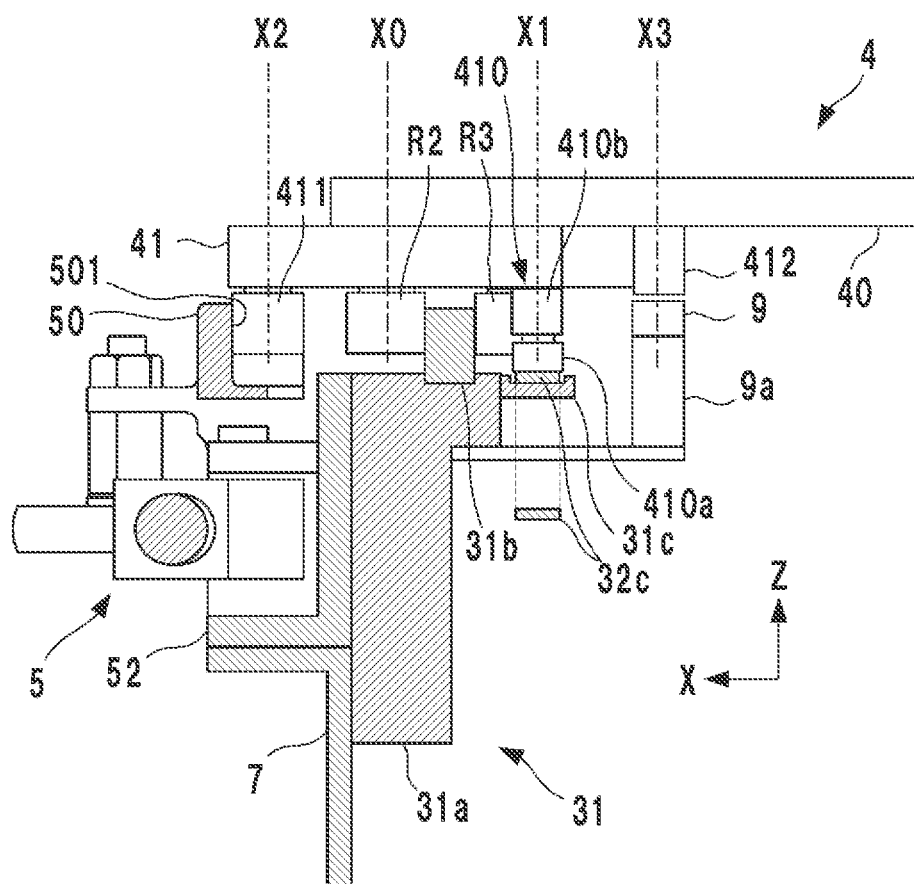
FIG. 16 is a view for explaining the arrangement of components of the driven unit shown in FIG. 15.

FIG. 15 is a perspective view showing an example of a driven unit 41 provided with a detection target portion 412. In the example shown in FIG. 15, the detection target portion 412 is fixed to the inner side surface of a main body member 41a. FIG. 16 is a sectional view showing an arrangement example of a sensor 9 that detects the detection target portion 412. The sensor 9 is, for example, an optical sensor or a magnetic sensor, and detects whether the detection target portion 412 exists immediately above it. The sensor 9 is fixed to a frame main body 31a of a support frame 31 via a bracket 9a at a position corresponding to the stop position of a workpiece.

The X-direction position of the detection target portion 412 needs to be appropriately set with respect to a stopping unit 5, a guide portion 31b, and the like. In this embodiment, since each roller R2 abuts against the side surface of the guide portion 31b, for example, by using a rotation center X0 of the roller R2 as a reference position, it is possible to determine a position X2 of an abutment portion 411, a position X1 of a frictional engagement unit 410, and a position X3 of the detection target portion 412. Since all of these positions are determined in the driven unit 41, it is not required to perform position adjustment upon assembling a conveyance device 3.

Third Embodiment

Figure 17:
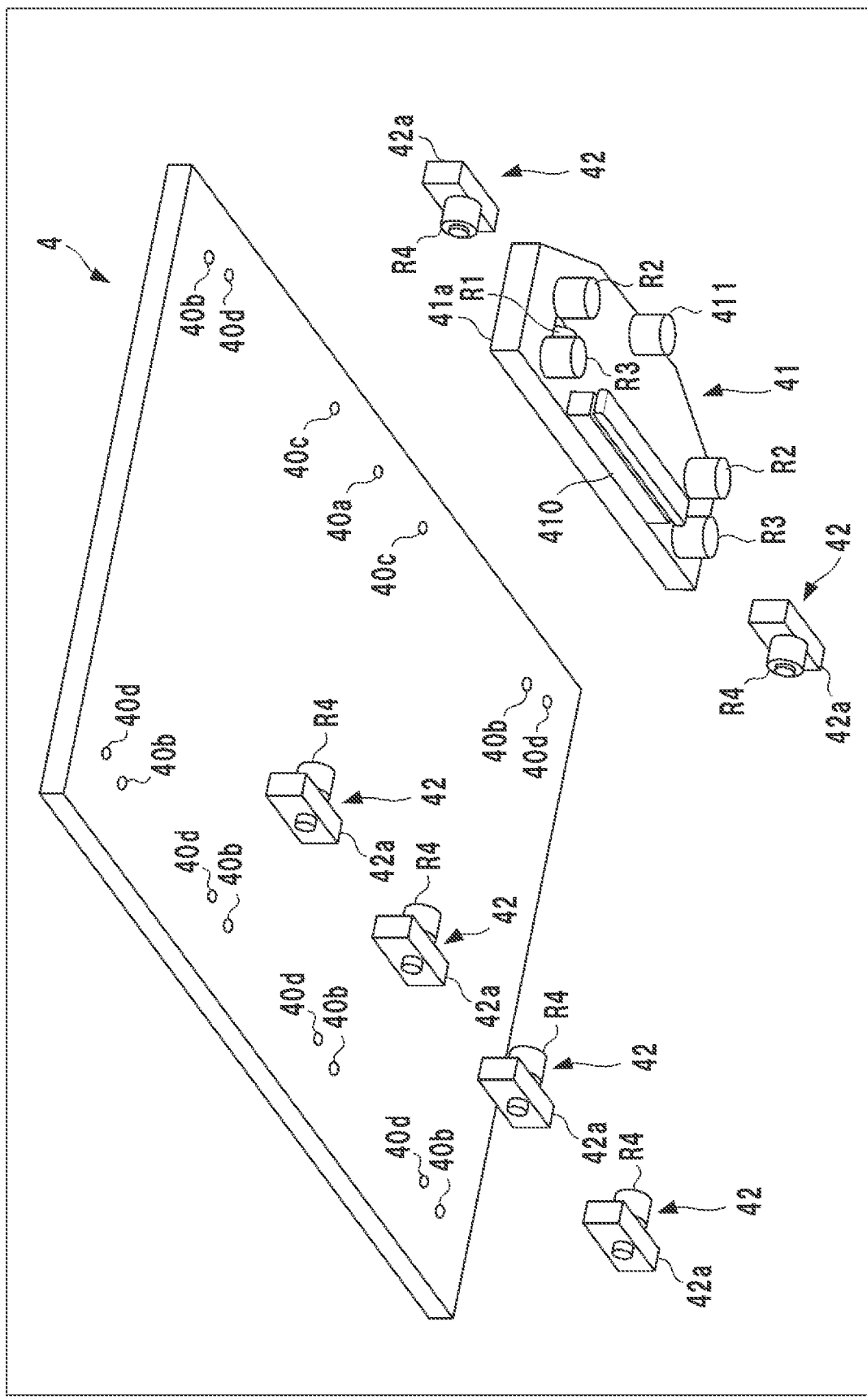
FIG. 17 is an exploded perspective view of a pallet according to still another example.

The numbers and positions of the driven units 41 and the auxiliary units 42 in the pallet 4 can be appropriately selected. FIG. 17 shows another arrangement example of the pallet 4. The shown example is an arrangement example of a pallet 4 suitable for a relatively large workpiece. Six auxiliary units 42 are provided. Two of them are arranged at the front and back of a driven unit 41 and configured to travel on the support frame 31 (not shown in FIG. 17). Remaining four auxiliary units 42 are configured to travel on the support frame 30 (not shown in FIG. 17). When it is necessary to change the specifications of the pallet 4 since the type of workpiece is changed, it is possible to change the specifications as described above. In this case as well, it is not required to redesign the driven unit 41 and the auxiliary unit 42, and only a placement member 40 may be newly designed.

Although embodiments of the present invention have been described above, the present invention is not limited to the above-described embodiments, and various changes and modifications can be made within the spirit and scope of the present invention. Therefore, to apprise the public of the scope of the present invention, the following claims are made.

The invention claimed is:

1. A conveyance device comprising:
a pair of a first support frame and a second support frame provided so as to be parallel to each other, and configured to define a conveyance track of a pallet including a placement member on which a workpiece is placed;
a driving unit provided on the first support frame and configured to apply a conveyance force to the pallet;
a driven unit as a unit forming the pallet, configured to travel along a first guide portion of the first support frame by receiving the conveyance force from the driving unit;
an auxiliary unit as a unit forming the pallet, connected to the driven unit via the placement member and configured to freely travel along a second guide portion of the second support frame, and
a stopping unit provided on the first support frame, including an engaging portion that engages with a portion of the driven unit, and configured to temporarily stop a movement of the pallet at a predetermined stop position along the conveyance track
wherein the driven unit comprises:
a main body member to which the placement member is fixed;
a plurality of rollers rotatably provided on the main body member and configured to abut against the first guide portion;
a first engaging portion provided on a lower portion of the main body member and configured to frictionally engage with the driving unit to receive the conveyance force; and
a second engaging portion provided on the main body member and configured to engage with the engaging portion of the stopping unit,
the first guide portion includes an outer guide surface and an inner guide surface in a widthwise direction of the conveyance track,
the plurality of rollers include a plurality of guide rollers provided on a lower surface of the main body member so as to be rotatable around a vertical axis, and
the plurality of guide rollers include an outer guide roller that abuts against the outer guide surface, and an inner guide roller that abuts against the inner guide surface.

2. The conveyance device according to claim 1, further comprising a sensor configured to detect that the driven unit has reached the predetermined stop position,
wherein the driven unit includes a detection target portion to be detected by the sensor.

3. A driven unit forming a pallet to be conveyed by a conveyance mechanism, wherein
the conveyance mechanism comprises:
a pair of a first support frame and a second support frame provided so as to be parallel to each other, and configured to define a conveyance track of the pallet including a placement member on which a workpiece is placed;
a driving unit provided on the first support frame and configured to apply a conveyance force to the pallet; and
a stopping unit provided on the first support frame, including an engaging portion that engages with a portion of the pallet, and configured to temporarily stop a movement of the pallet at a predetermined stop position along the conveyance track,
the driven unit is a unit that travels along a first guide portion of the first support frame by receiving the conveyance force from the driving unit,
the pallet comprises the driven unit, the placement member, and an auxiliary unit connected to the driven unit via the placement member and configured to freely travel along a second guide portion of the second support frame,
the driven unit comprises:
a main body member to which the placement member is fixed;
a plurality of rollers rotatably provided on the main body member and configured to abut against the first guide portion;
a first engaging portion provided on a lower portion of the main body member and configured to frictionally engage with the driving unit to receive the conveyance force; and
a second engaging portion provided on the main body member and configured to engage with the engaging portion of the stopping unit
the first guide portion includes an outer guide surface and an inner guide surface in a widthwise direction of the conveyance track,
the plurality of rollers include a plurality of guide rollers provided on a lower surface of the main body member so as to be rotatable around a vertical axis, and
the plurality of guide rollers include an outer guide roller that abuts against the outer guide surface, and an inner guide roller that abuts against the inner guide surface.

4. The driven unit according to claim 3, wherein
the main body member includes opening portions, and
a plurality of support rollers arranged in the opening portions so as to be rotatable around a horizontal axis, and supported from below by the first guide portion.

5. The driven unit according to claim 3, wherein
the plurality of rollers include a first set of guide rollers and a second set of guide rollers spaced apart from each other in a direction of the conveyance track,
each of the first set of guide rollers and the second set of guide rollers comprises the outer guide roller and the inner guide roller, and
a position of the second engaging portion in the direction of the conveyance track is a position between the first guide roller and the second guide roller.

6. The driven unit according to claim 5, wherein
a barycentric position of the placement member in the direction of the conveyance track is at the same position as the position of the second engaging portion in the direction of the conveyance track.

7. The driven unit according to claim 3, including a detection target portion to be detected by a sensor configured to detect that the driven unit has reached the predetermined stop position.

8. The driven unit according to claim 3, wherein
the plurality of rollers include a first set of guide rollers and a second set of guide rollers spaced apart from each other in a direction of the conveyance track,
each of the first set of guide rollers and the second set of guide rollers comprises the outer guide roller and the inner guide roller, and
a position of the first engaging portion in the direction of the conveyance track is a position between the first guide roller and the second guide roller.

9. A pallet to be conveyed by a conveyance mechanism, wherein
the conveyance mechanism includes:
a support frame configured to define a conveyance track of the pallet;
a driving unit provided on the support frame and configured to apply a conveyance force to the pallet; and
a stopping unit provided on the support frame, including an engaging portion that engages with a portion of the pallet, and configured to temporarily stop a movement of the pallet at a predetermined stop position along the conveyance track,
the pallet comprises:
a placement member on which a workpiece is placed; and
a driven unit configured to travel along a guide portion of the support frame by receiving the conveyance force from the driving unit,
the driven unit comprises:
a main body member to which the placement member is fixed;
a plurality of rollers rotatably provided on the main body member and configured to abut against the guide portion;
a first engaging portion provided on a lower portion of the main body member and configured to frictionally engage with the driving unit to receive the conveyance force; and
a second engaging portion provided on the main body member and configured to engage with the engaging portion of the stopping unit,
the support frame includes a pair of a first support frame and a second support frame provided so as to be parallel to each other, and configured to define the conveyance track of the pallet;
the driven unit is configured to travel along a first guide portion of the first support frame,
the first guide portion includes an outer guide surface and an inner guide surface in a widthwise direction of the conveyance track,
the plurality of rollers include a plurality of guide rollers provided on a lower surface of the main body member so as to be rotatable around a vertical axis, and
the plurality of guide rollers include an outer guide roller that abuts against the outer guide surface, and an inner guide roller that abuts against the inner guide surface.

10. The pallet according to claim 9,
further comprising an auxiliary unit connected to the driven unit via the placement member and configured to freely travel along a second guide portion of the second support frame.

11. The pallet according to claim 10, wherein the auxiliary unit comprises a second main body member to which the placement member is fixed; and at least one roller rotatably provided on the second main body member and configured to abut against the second guide portion.

\* \* \* \* \*